US008073275B2

(12) United States Patent
Shatz et al.

(10) Patent No.: US 8,073,275 B2
(45) Date of Patent: Dec. 6, 2011

(54) IMAGE ADAPTATION WITH TARGET SIZE, QUALITY AND RESOLUTION CONSTRAINTS

(75) Inventors: Amir Shatz, Tzur-Igal (IL); Yair Hougui, Tel Mond (IL); Dan Raudnitz, Hod-Hasharon (IL)

(73) Assignee: Mobixell Networks Ltd., Ra'Anana (IL)

( * ) Notice: Subject to any disclaimer, the term of this patent is extended or adjusted under 35 U.S.C. 154(b) by 1075 days.

(21) Appl. No.: 11/815,648

(22) PCT Filed: Feb. 5, 2006

(86) PCT No.: PCT/IL2006/000139
§ 371 (c)(1), (2), (4) Date: Oct. 26, 2007

(87) PCT Pub. No.: WO2006/085301
PCT Pub. Date: Aug. 17, 2006

(65) Prior Publication Data
US 2008/0196076 A1 Aug. 14, 2008

Related U.S. Application Data

(60) Provisional application No. 60/651,070, filed on Feb. 9, 2005.

(51) Int. Cl.

| | |
|---|---|
| ***G06K 9/00*** | (2006.01) |
| ***G06K 9/36*** | (2006.01) |
| ***G06K 9/46*** | (2006.01) |
| ***G06K 9/60*** | (2006.01) |
| ***G06F 7/00*** | (2006.01) |
| ***G06F 15/177*** | (2006.01) |
| ***G06F 15/16*** | (2006.01) |

(52) U.S. Cl. ........ 382/239; 382/162; 382/232; 382/244; 382/251; 382/305; 709/221; 709/230; 709/231; 707/693; 707/999.101; 707/999.107

(58) Field of Classification Search ................ 382/162, 382/232, 239, 244, 251–253, 305; 709/221, 709/230–231; 707/10, 104.1, 513
See application file for complete search history.

(56) References Cited

U.S. PATENT DOCUMENTS

| | | | | |
|---|---|---|---|---|
| 6,381,465 | B1 | 4/2002 | Chern et al. | |
| 6,563,517 | B1 * | 5/2003 | Bhagwat et al. | 715/735 |
| 6,931,159 | B2 | 8/2005 | Ridge | |
| 6,970,602 | B1 * | 11/2005 | Smith et al. | 382/232 |

(Continued)

OTHER PUBLICATIONS

Wai Yip Lum; Lau, F.C.M.; , "A context-aware decision engine for content adaptation," Pervasive Computing, IEEE , vol. 1, No. 3, pp. 41-49, 2002 doi: 10.1109/MPRV.2002.1037721.*

(Continued)

*Primary Examiner* — Anand Bhatnagar
*Assistant Examiner* — Nathan Bloom
(74) *Attorney, Agent, or Firm* — D. Kligler I.P. Services Ltd.

(57) ABSTRACT

A computer-implemented method for image adaptation includes accepting a digitally-represented input image and a target size requirement. The input image is modified by optimally determining at least one of a resolution of the input image and a quality of the input image, the quality defining an amount of information allocated to represent each pixel value of the input image, so as to produce a compressed output image meeting the target size requirement.

31 Claims, 8 Drawing Sheets

U.S. PATENT DOCUMENTS

| | | | | |
|---|---|---|---|---|
| 6,995,769 | B2 * | 2/2006 | Ordentlich et al. | 345/520 |
| 2002/0090140 | A1 * | 7/2002 | Thirsk | 382/239 |
| 2002/0169823 | A1 * | 11/2002 | Coulombe et al. | 709/203 |
| 2002/0172418 | A1 * | 11/2002 | Hu | 382/166 |
| 2002/0177454 | A1 | 11/2002 | Karri et al. | |
| 2004/0165783 | A1 * | 8/2004 | Reynolds et al. | 382/239 |
| 2004/0252238 | A1 | 12/2004 | Park et al. | |
| 2005/0122427 | A1 | 6/2005 | Hougui et al. | |
| 2006/0141923 | A1 | 6/2006 | Goss | |

OTHER PUBLICATIONS

Vetro, A.; Christopoulos, C.; Huifang Sun; , "Video transcoding architectures and techniques: an overview," Signal Processing Magazine, IEEE , vol. 20, No. 2, pp. 18-29, Mar. 2003 doi: 10.1109/MSP.2003.1184336.*

CompuServe Inc., "Graphics Interchange Format Programming Reference," Jul. 31, 19990, <www.w3.org/Graphics/GIF/spec-fit89a.txt>.

World Wide Web Consortium (W3C), "Portable Network Graphics (PNG) Specification (Second Edition) Information Technology—Computer Graphics and Image Processing—Portable Network Graphics (PNG): Functional Specification," Nov. 10, 2003, <www.w3.org./TR/PNG>.

Keys, "Cubic Convolution Interpolation for Digital Image Processing," IEEE Transactions on Acoustics, Speech and Signal Processing (ASSP), 1981; 29(6): 1153-1160.

www.intel.com/cd/software/products/asmo-na/eng/perflib/ipp/index.htm, Jun. 29, 2008.

U.S. Appl. No. 60/651,070, filed Feb. 9, 2005.

Ke et al., "Efficient Near-duplicate Detection and sub-image Retrieval," Proc. of ACM Int. Con. On Multimedia (MM), Aug. 2004, IRP-TR-04-07.

Chang et al., "RIME: A Replicated Image Detector for the World-Wide Web", Proc. of SPIE Symposium of Voice, Video, and Data Communications, Boston, MA, Nov. 1998, 58-67.

Tan et al., "A Framework for Measuring Video Similarity and its Application to Video Query by Example", ICIP, 1999; 2: 106-110.

Ganchev et al., "Comparative Evaluation of Various MFCC Implementations on the Speaker Verification Task", University of Patras, Greece, 2004.

Haitsma and Kalker, "A Highly Robust Audio Fingerprinting System", IRCAM, 2002.

"Information Technology—Digital Compression and Coding of Continuous—Tone Still Images—Requirements and Guidelines", Sep. 1992, <www.jpeg.org>.

http://www.openmobilealliance.org/, Jun. 29, 2008.

* cited by examiner

28
MOBILE NETWORK
24

APPLICATIONS
32
MEDIA ADAPTATION SERVER
40
MEDIA CONTENT STORAGE
36
20

MEDIA ADAPTATION SERVER
INTERFACE
44
ADAPTATION PROCESSOR
48
TERMINAL PROFILES
52
40

ADAPTATION PROCESSOR
48
INPUT IMAGE
88
INPUT FORMAT CLASSIFIER
92A
92B
92C
GIF DECODER
PNG DECODER
JPEG DECODER
96
IMAGE QUALITY CONTROL
100
PALETTE QUANTIZER
104
JPEG Q-FACTOR CONTROL
108
COLOR DEPTH CONTROL
112
IMAGE RESOLUTION CONTROL
118
MANAGEMENT
116A
116B
116C
GIF ENCODER
PNG ENCODER
JPEG ENCODER
OUTPUT IMAGE

ACCEPT INPUT IMAGE AND TARGET CHARACTERISTICS
120

DETERMINE OUTPUT FORMAT
122
124
QUALITY CONTROL EFFECTIVE ?
YES
NO
128
126
QSET=QMIN
QSET=QMAX
132
ENCODE USING QSET
134
TARGET SIZE CONSTRAINT ?
NO
YES
138
CAN MEET TARGET SIZE WITHOUT RESIZING?
YES
NO
140
142
MODIFY IMAGE QUALITY
RESIZE IMAGE
OUTPUT IMAGE
136

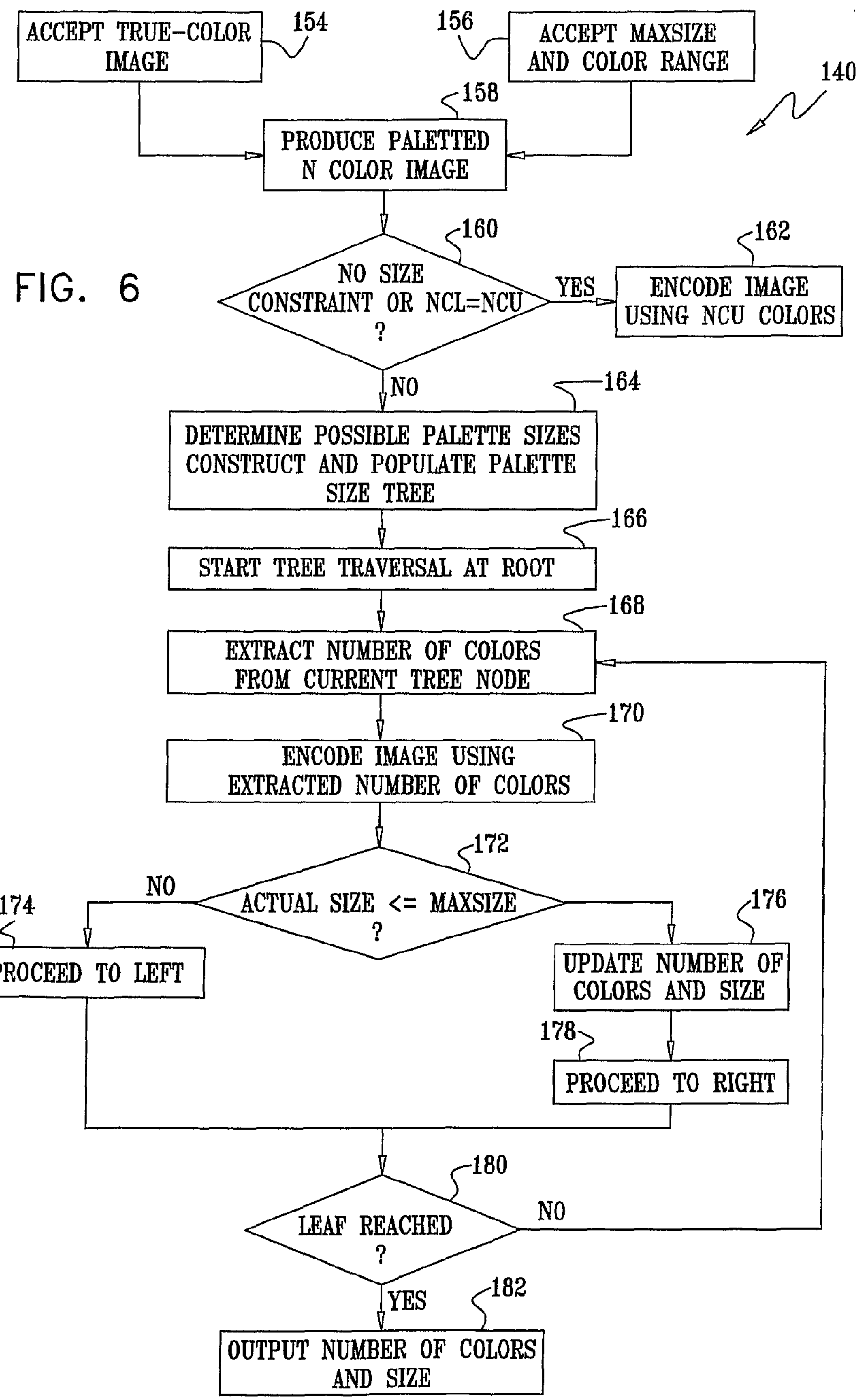

ACCEPT TRUE-COLOR IMAGE
154
156
ACCEPT MAXSIZE AND COLOR RANGE
140
158
PRODUCE PALETTED N COLOR IMAGE
160
NO SIZE CONSTRAINT OR NCL=NCU ?
YES
162
ENCODE IMAGE USING NCU COLORS
FIG. 6
NO
164
DETERMINE POSSIBLE PALETTE SIZES CONSTRUCT AND POPULATE PALETTE SIZE TREE
166
START TREE TRAVERSAL AT ROOT
168
EXTRACT NUMBER OF COLORS FROM CURRENT TREE NODE
170
ENCODE IMAGE USING EXTRACTED NUMBER OF COLORS
172
ACTUAL SIZE <= MAXSIZE ?
NO
174
PROCEED TO LEFT
176
UPDATE NUMBER OF COLORS AND SIZE
178
PROCEED TO RIGHT
180
LEAF REACHED ?
NO
YES
182
OUTPUT NUMBER OF COLORS AND SIZE

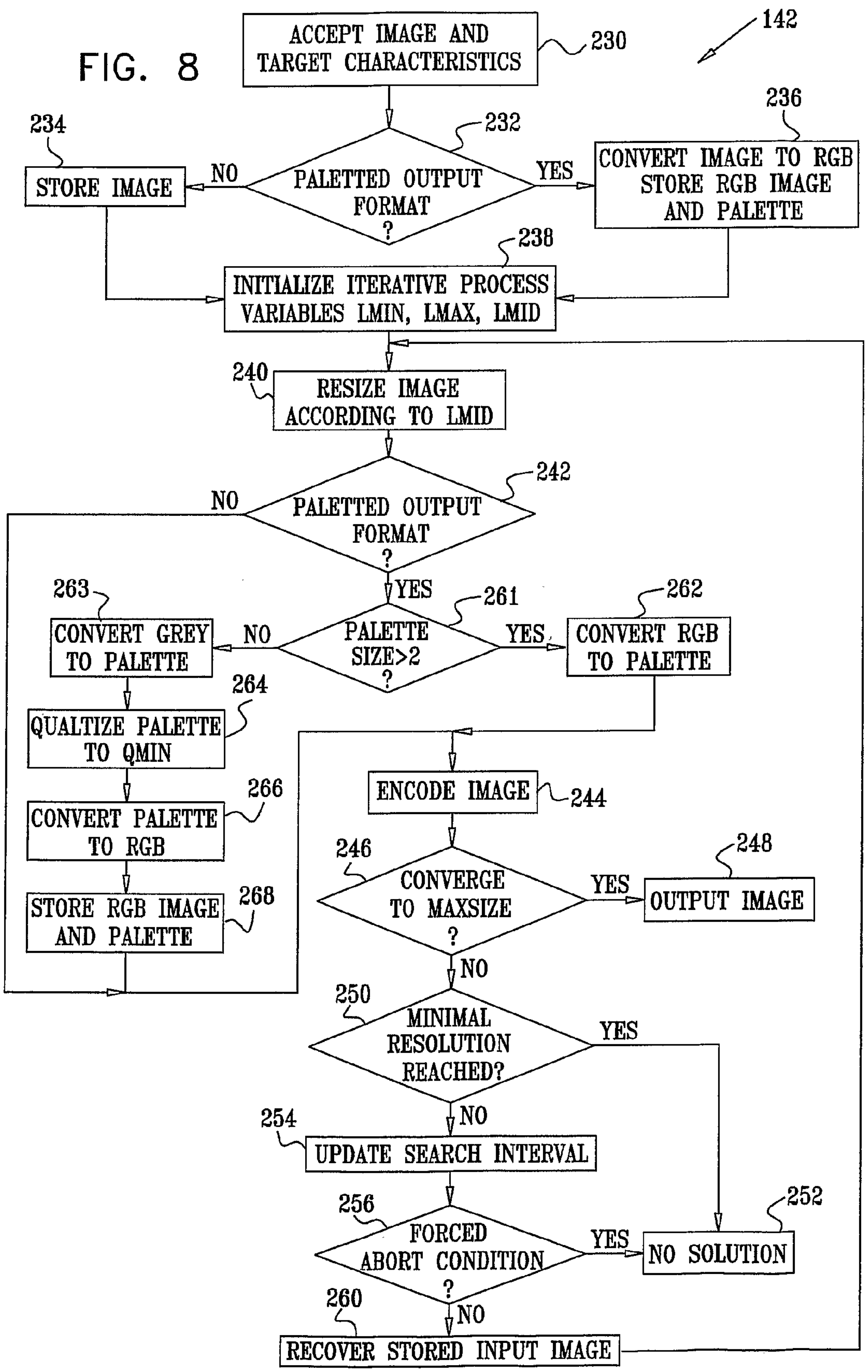
FIG. 8
142
ACCEPT IMAGE AND TARGET CHARACTERISTICS
230
PALETTED OUTPUT FORMAT ?
232
NO
YES
STORE IMAGE
234
CONVERT IMAGE TO RGB STORE RGB IMAGE AND PALETTE
236
INITIALIZE ITERATIVE PROCESS VARIABLES LMIN, LMAX, LMID
238
RESIZE IMAGE ACCORDING TO LMID
240
PALETTED OUTPUT FORMAT ?
242
NO
YES
PALETTE SIZE>2 ?
261
NO
YES
CONVERT GREY TO PALETTE
263
CONVERT RGB TO PALETTE
262
QUALTIZE PALETTE TO QMIN
264
CONVERT PALETTE TO RGB
266
STORE RGB IMAGE AND PALETTE
268
ENCODE IMAGE
244
CONVERGE TO MAXSIZE ?
246
YES
OUTPUT IMAGE
248
NO
MINIMAL RESOLUTION REACHED?
250
YES
NO
UPDATE SEARCH INTERVAL
254
FORCED ABORT CONDITION ?
256
YES
NO SOLUTION
252
NO
RECOVER STORED INPUT IMAGE
260

IMAGE ADAPTATION WITH TARGET SIZE, QUALITY AND RESOLUTION CONSTRAINTS

CROSS REFERENCE To PRIOR APPLICATION

This application is the U.S. national phase of International Application No. PCT/IL2006/000139, filed Feb. 5, 2006, which claims priority from U. S. Provisional Application No. 60/651,070, filed Feb. 9, 2005, which is incorporated herein by reference. This application is related to U.S. Patent Application Publication 2005/0122427, Ser. No. 10/985,026, filed Nov. 10, 2004, which is assigned to the assignee of the present patent application and whose disclosure is into orated herein b reference. The International Application published in English on Aug. 17, 2006 as WO 2006/085301 under PCT Article 21(2).

COPYRIGHT NOTICE

Program listings in the disclosure of the provisional patent application cited below contain material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates generally to image adaptation and compression, and particularly to methods and systems for compressing images to match specified target size, quality and/or resolution constraints.

BACKGROUND OF THE INVENTION

Various systems and applications apply image adaptation and compression techniques to reduce the data size of digitally-represented images. A number of compressed image standards are known in the art, such as the Graphic Interchange Format (GIF) standard, the Portable Network Graphics (PNG) standard and the Joint Photographic Experts Group (JPEG) standard.

The GIF file format is described in a specification published by Compuserve Inc. (Columbus, Ohio) entitled "Graphics Interchange Format Programming Reference," July 1990, which is incorporated herein by reference. The specification is available at www.w3.org/Graphics/GIF/spec-gif89a.txt.

The PNG file format is specified in a recommendation of the World Wide Web Consortium (W3C) entitled "Portable Network Graphics (PNG) Specification (Second Edition) Information technology—Computer Graphics and Image Processing—Portable Network Graphics (PNG): Functional Specification," November 2003, which is incorporated herein by reference. The PNG specification is also available at www.w3.org/TR/PNG.

The JPEG file format is defined in recommendation T.81 of the International Telecommunication Union (ITU) entitled "Information Technology—Digital Compression and Coding of Continuous-Tone Still Images—Requirements and Guidelines," September 1992, which is incorporated herein by reference. Further information regarding the JPEG standard is also available at www.jpeg.org.

SUMMARY OF THE INVENTION

In some applications, it is desirable to adapt an image so as to comply with certain target characteristics, such as target file size and/or resolution. For example, some communication systems send images to be displayed by mobile communication terminals. The mobile terminals often have limited processing, memory and/or display capabilities. In such applications it is often desirable to adapt the images sent to a particular terminal in order to match the terminal capabilities, a process commonly referred to as media adaptation. Target file size limitations may also be imposed by the system to reduce traffic load.

Embodiments of the present invention provide methods and systems for adapting and compressing images so as to comply with target file size, quality and/or resolution requirements. In some embodiments, the quality and/or resolution of the image are modified to comply with the target characteristics. Exemplary methods are described for adapting the quality and resolution of images conforming to different formats, such as paletted images, JPEG images and bitmap true-color images. The resolution adaptation methods described herein are suitable for adapting images conforming to both known and future image formats.

There is therefore provided, in accordance with an embodiment of the present invention, a computer-implemented method for image adaptation, including:

accepting a digitally-represented input image;

accepting a target size requirement; and modifying the input image by reducing at least one of a resolution of the input image and a quality of the input image, the quality defining an amount of information allocated to represent each pixel value of the input image, so as to produce a compressed output image meeting the target size requirement.

In an embodiment, accepting the input image includes accepting the input image at a media adaptation server in a communication system, the target size requirement relates to at least one of a capability of a destination terminal in the communication system to which the input image is addressed and a network limitation of the communication system, modifying the input image includes producing the compressed output image so as to match the capability, and the method includes transmitting the compressed output image to the destination terminal.

Additionally or alternatively, accepting the input image includes accepting a minimum tolerable quality requirement, and modifying the input image includes reducing the quality of the input image while meeting the minimum tolerable quality requirement, and reducing the resolution of the input image only when reducing the quality of the input image while meeting the minimum tolerable quality requirement does not meet the target size requirement.

In another embodiment, the input image conforms to an input image file format and modifying the input image includes producing the compressed output image conforming to an output image file format different from the input image file format.

In yet another embodiment, the input image conforms to an input image file format, accepting the input image includes accepting a desired output image file format, and modifying the input image includes decoding the input image responsively to the image file format to produce a raw true-color image and converting the raw true-color image to the compressed output image having the output image file format.

In an embodiment, the desired output image format includes a paletted image file format, and reducing the quality of the input image includes determining a palette size of an output color palette of the compressed output image causing the compressed output image to meet the target size requirement. Determining the palette size may include defining a plurality of possible palette sizes and iteratively searching over the plurality for an optimal palette size having a highest number of colors from among the plurality while meeting the target size requirement. Defining the plurality of the possible palette sizes may include arranging the possible palette sizes in a binary search tree, and searching over the plurality may include traversing the binary search tree so as to reduce a number of search iterations.

In another embodiment, the desired output image file format includes a Joint Photographic Experts Group (JPEG) image file format, and reducing the quality of the input image includes determining an optimal JPEG quality factor value for encoding the compressed output image while meeting the target size requirement. Determining the optimal quality factor value may include iteratively narrowing a search interval of quality factor values in search of a quality factor value satisfying a predetermined convergence condition related to the target size requirement.

In an embodiment, iteratively narrowing the search interval includes detecting a forced abort condition before determining the optimal quality factor value, and aborting the method responsively to the detected condition.

In another embodiment, reducing the quality of the input image includes determining a quantization table responsively to the optimal quality factor value and producing the output image encoded using the determined quantization table.

In still another embodiment, the desired output image file format includes a bitmap image format, and reducing the quality of the input image includes determining a number of bits used to encode each pixel value of the output image.

In another embodiment, the desired output image file format includes a paletted image file format, and reducing the resolution of the input image includes converting the input image to a raw true-color image, reducing the resolution of the raw true-color image to produce a resized image, and encoding the resized image in accordance with the paletted image file format to produce the compressed output image.

In an embodiment, reducing the resolution of the input image includes iteratively searching over a range of allowed resolution values for a highest resolution value meeting the target size requirement.

There is additionally provided, in accordance with an embodiment of the present invention, apparatus for image adaptation, including:

an interface, which is arranged to accept a digitally-represented input image and a target size requirement; and a processor, which is arranged to modify the input image by reducing at least one of a resolution of the input image and a quality of the input image, the quality defining an amount of information allocated to represent each pixel value of the input image, so as to produce a compressed output image meeting the target size requirement.

There is also provided, in accordance with an embodiment of the present invention, a communication system, including:

one or more communication terminals, which are arranged to accept and display digitally-represented images; and a media adaptation server, which is arranged to accept a digitally-represented input image addressed to a destination terminal selected from the one or more communication terminals, to accept a target size requirement, to modify the input image by reducing at least one of a resolution of the input image and a quality of the input image, the quality defining an amount of information allocated to represent each pixel value of the input image, so as to produce a compressed output image meeting the target size requirement, and to send the compressed output image to the destination terminal.

In an embodiment, the media adaptation server includes a terminal profile database holding image-handling capability profiles of respective terminal types, and the media adaptation server is arranged to retrieve at least one of the target size requirement and a maximum resolution requirement from a capability profile of a terminal type to which the destination terminal belongs.

There is further provided, in accordance with an embodiment of the present invention, a computer software product for image adaptation, the product including a computer-readable medium, in which program instructions are stored, which instructions, when read by a computer, cause the computer to accept a digitally-represented input image and a target size requirement, and to modify the input image by reducing at least one of a resolution of the input image and a quality of the input image, the quality defining an amount of information allocated to represent each pixel value of the image, so as to produce a compressed output image meeting the target size requirement.

The present invention will be more fully understood from the following detailed description of the embodiments thereof, taken together with the drawings in which:

BRIEF DESCRIPTION OF THE DRAWINGS

FIG. 6 is a flow chart that schematically illustrates a method for adjusting the quality of paletted images, in accordance with an embodiment of the present invention;

FIG. 8 is a flow chart that schematically illustrates a method for adjusting image resolution, in accordance with an embodiment of the present invention.

DETAILED DESCRIPTION OF EMBODIMENTS

System Description

Figures 1A, 1B:
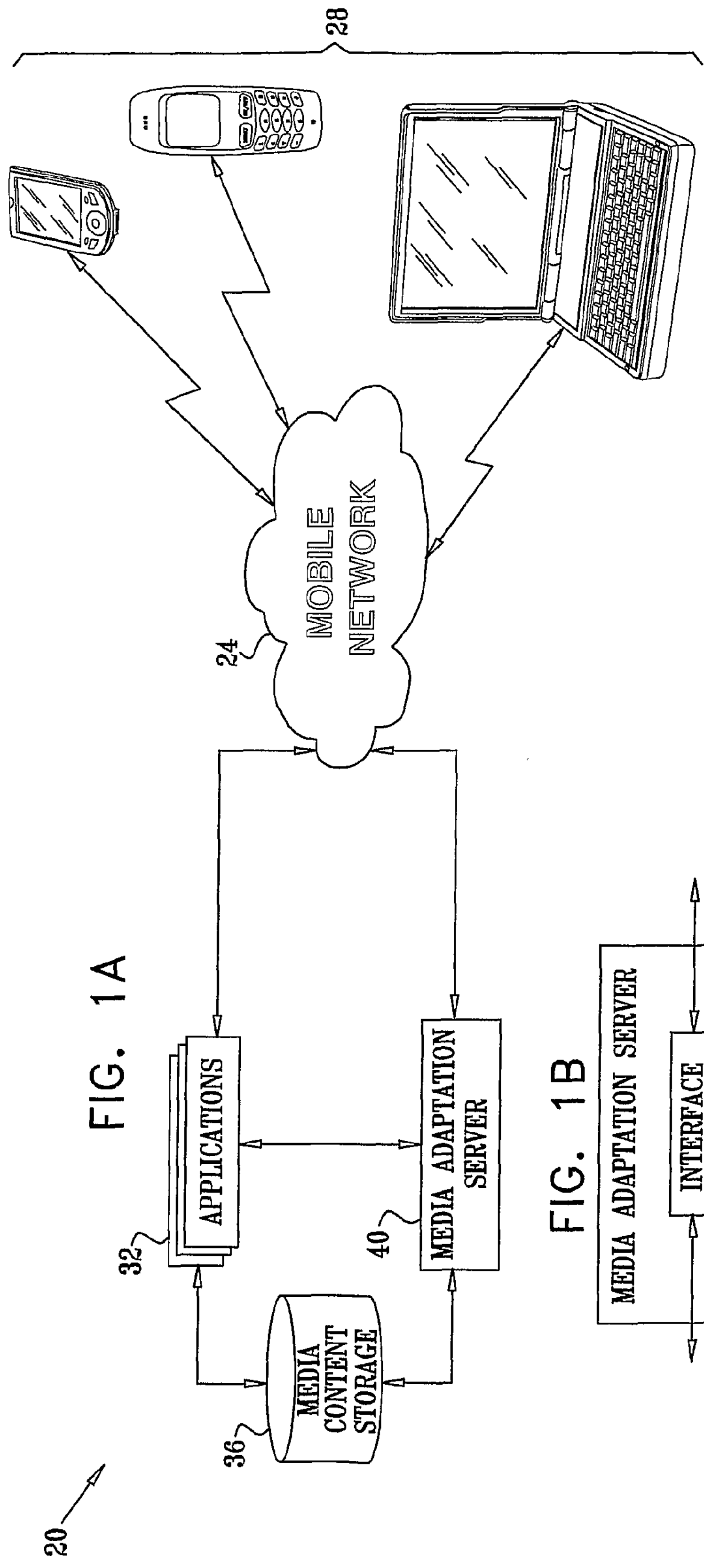
FIG. 1A is a block diagram that schematically illustrates a mobile communication system, in accordance with an embodiment of the present invention.
FIG. 1B is a block diagram that schematically illustrates a media adaptation server, in accordance with an embodiment of the present invention.

FIG. 1A is a block diagram that schematically illustrates a communication system 20, in accordance with an embodiment of the present invention. System 20 comprises a mobile network 24, which provides communication services to mobile terminals 28. Terminals 28 may comprise cellular phones, wireless-enabled personal digital assistants (PDA) and laptop computers, as well as any other suitable terminal. Network 24 may conform to any suitable communication standard or protocol.

In particular, system 20, via network 24, provides services that involve sending images to be displayed by terminals 28. In some embodiments, system 20 comprises one or more applications 32, which provide image-related services. Image-related services may comprise, for example, multimedia messaging services (MMS), services for exchanging MMS messages to and from e-mail accounts, for producing and sharing multimedia albums and for downloading wallpaper images to mobile terminals. Other exemplary service may comprise push services for sending news, jokes or other content, and/or any other suitable service that involves sending image-related content to terminals 28. The images are typically stored in a media content storage device 36. In general, terminals 28 may receive images sent by applications 32 or by other terminals.

Images are normally represented, stored and exchanged as image files, in accordance with a certain image file format or standard. For example, images may comprise true-color RGB images such as bitmap (BMP) images, or conform to the GIF, PNG or JPEG format cited above. Some of the known image formats compress the image in order to reduce the image file size. Nevertheless, in many practical cases, the digital representation of images requires large amounts of data, and image files are often large in size.

For purposes such as image display or processing, images are often represented in a raw format as a rectangular array of picture elements called pixels. In a raw bitmap representation, the color and/or intensity value of each pixel is defined individually. For example, in true-color RGB representation, a pixel is represented using three bytes of information, one byte for each of the red, green and blue color components. In a raw indexed or palette representation, each pixel holds an index to a color table called a palette. The operation of encapsulating a raw image representation in a particular file format is called encoding. The terms encoding and compressing are used interchangeably herein, since the encoding operation sometimes reduces the image file size. The inverse operation to encoding, i.e., reproducing a raw image representation out of a particular file format, is called decoding. Terminals 28 typically decode the received image file in order to display the image. The term format may be used to describe both raw representation formats and file formats.

In many practical cases, terminals 28 have limited image handling capabilities, which may differ from one terminal type to another. For example, different terminals often have screens of different sizes and color capabilities. The internal memory capacity and processing power may also vary from one terminal type to another.

In order to enable mobile terminals of different types and capabilities to accept, process and display image files, system 20 comprises a media adaptation server 40. When an image is to be sent to a particular destination terminal 28, server 40 converts the image so that its characteristics match the capabilities of the destination terminal. The converted image is then sent over network 24 to the destination terminal. An exemplary media adaptation server is a rich media service center (RMSC) product offered by Mobixell Networks Ltd. (Raanana, Israel). Further details regarding this product are available at www.mobixell.com.

In some embodiments, server 40 adapts the image so as to conform to a specified file format. In particular, server 40 adapts the image so as to comply with specified target file size, quality and resolution requirements, using methods that are described in detail below. In the context of the present patent application and in the claims, the terms "size" and "file size" are used interchangeably to describe the amount of data (typically expressed in bytes) used to represent the encoded image. These terms do not relate to, and should not be confused with, the geometrical size of the image. The geometrical size, or area, of the image is referred to herein as the resolution of the image. Image resolution is typically defined in terms of the number of pixels used to represent the image in the vertical or horizontal dimension. Referring to the resolution of an encoded image typically means to refer to the resolution of its corresponding raw representation.

The target size and resolution requirements may be specified based on the capabilities of the destination terminal. Additionally or alternatively, target size requirements may be imposed by network 24 regardless of the destination terminal type, in order to match the traffic capacity of the network. In some embodiments, in particular when the input image conforms to the same file format as the desired format of the output image file, the target size is also constrained to be no greater than the file size of the encoded input image. This limitation prevents the output image file from being larger than the input file.

FIG. 1B is a block diagram that schematically shows details of media adaptation server 40, in accordance with an embodiment of the present invention. Server 40 comprises a network interface 44, which communicates with applications 32, media content storage device 36 and/or with mobile network 24. Server 40 comprises an adaptation processor 48, which carries out the compression and media adaptation methods described herein.

In some embodiments, server 40 comprises a terminal profile database 52, which holds capability profiles of different types of terminals 28. Each terminal profile is associated with a particular terminal model, and comprises parameters such as the maximum image file size and maximum screen resolution that can be handled by the terminal. The terminal profile may also comprise definitions of image formats supported by the terminal. In these embodiments, when processor 48 intends to compress an image to be sent to a particular destination terminal, the processor queries database 52 in order to determine the target characteristics of the compressed image. In some embodiments, a terminal 28 may comprise internal resizing and/or scrolling capabilities. In these embodiments, the terminal may accept an image resolution larger than the physical dimensions of its screen. Additionally or alternatively, some target characteristics may be provided to server 40 using any other suitable means, such as using configurable parameter files.

Image files may be provided to server 40 using any suitable interface. For example, the interface may comprise a request-response interface such as an extensible markup language over the hypertext transfer protocol (XML over HTTP) interface. The interface may comprise a standard transcoder Interface (STI) defined by the open mobile alliance (OMA). Further details regarding OMA and STI are available at www.openmobilealliance.org. Additionally or alternatively, server 40 may act as a proxy for MMS interfaces such as MM1, MM3, MM4 and MM7, as are known in the art. In some embodiments, images may be provided as part of a composite data structure comprising multiple objects, such as using a synchronized media integration language (SMIL) presentation.

Typically, media adaptation server 40 comprises a general-purpose computer, which is programmed in software to carry out the functions described herein. The software may be downloaded to the computer in electronic form, over a network, for example, or it may alternatively be supplied to the computer on tangible media, such as CD-ROM. The functions of server 40 may be carried out by a standalone computing platform or may alternatively be integrated with other functions in other computing platforms of system 20. Some functions of server 40 may be implemented in hardware or as a combination of hardware and software elements.

Image Adaptation with Target Size, Quality and Resolution Constraints

A digitally-represented image is encoded at a certain image quality. In the context of the present patent application and in the claims, the term "image quality" is used to describe the amount of information allocated, either directly or indirectly, to represent each pixel value of the decoded raw image. Quality can be defined, measured and modified in different fashions for different image formats.

For example, in bitmap images, the image quality is defined as the number of bits used to encode each pixel value (also referred to as the color depth of the image). A true-color (24 bit color depth) quality image can have up to about 16.7 million distinct colors, while a black-and-white quality image (1 bit per pixel) has at most two colors. For paletted images, a single byte index is usually used per pixel and the image quality is defined as the actual number of distinct colors in the palette (the palette size). For JPEG images, the image quality is typically determined by the JPEG encoder, which uses configurable quantization tables to quantize discrete cosine transform (DCT) coefficients, as is known in the art. A quality factor parameter is used to describe the selected JPEG quality, with a higher quality factor corresponding to higher image quality.

The quantitative qualities defined above for the different image file formats typically correspond to a subjective image quality, as perceived by the user. In other words, a higher quality image usually looks better. On the other hand, in many cases reducing the quality has only a slight affect on the perceived quality.

Image quality should not be confused with image resolution, the latter referring to the number of pixels used to represent the image. Images may have high resolution (i.e., be represented by a large array of pixels) but low quality (i.e., each pixel represented by a small amount of information) and vice versa. Both image quality and resolution typically affect the image file size. Thus, the size of an image file can be adapted by modifying the quality of the image, the resolution of the image, or both. Generally, however, higher image quality corresponds to a larger image file size, and vice versa.

Figure 2:
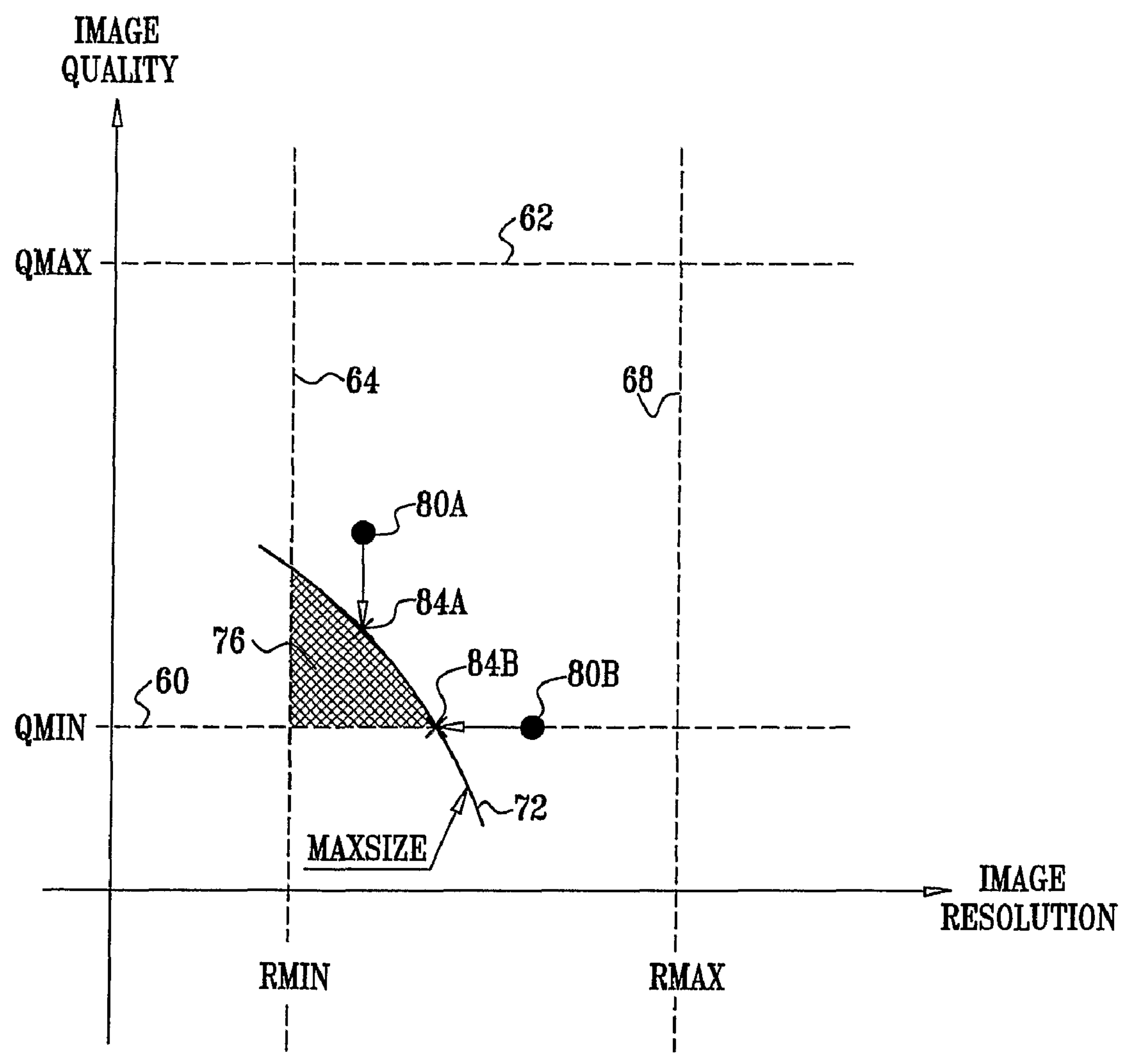
FIG. 2 is a graph that schematically illustrates relationships between compressed image size, quality and resolution, in accordance with an embodiment of the present invention.

FIG. 2 is a graph that schematically illustrates relationships between compressed image file size, quality and resolution, in accordance with an embodiment of the present invention. For a particular image, different combinations of quality and resolution are represented by points on a two-dimensional graph whose vertical axis shows the image quality and horizontal axis shows the image resolution.

Constraints imposed on the image characteristics are shown as lines or curves on the graph. For example, a line 60 shows a minimum tolerable quality requirement, denoted QMIN. A line 62 shows a maximum quality requirement denoted QMAX. Lines 64 and 68 show minimum and maximum resolution requirements denoted RMIN and RMAX, respectively. In some cases, RMAX may represent the maximal resolution accepted by the terminal. A curve 72 is an equal-file-size curve, corresponding to a maximum file size requirement denoted MAXSIZE. In other words, all points located on curve 72 correspond to encoded images having a file size MAXSIZE. All points located below and to the left of curve 72 correspond to images having a file size smaller than MAXSIZE, and all points located above and to the right of the curve correspond to file sizes larger than MAXSIZE.

A shaded region 76 shows the feasible combinations of quality and resolution values, i.e., the quality/resolution combinations that correspond to encoded images having a resolution and quality in the allowed range and whose file size is no greater than MAXSIZE.

The process of adapting an image to meet the MAXSIZE constraint can be viewed as moving from a starting point 80A or 80B, which corresponding to an image initially encoded at a certain resolution/quality combination having a file size greater than MAXSIZE, to an end point 84A or 84B, corresponding to the adapted output image meeting MAXSIZE. For example, consider an image corresponding to point 80A in FIG. 2. Point 80A is located outside region 76 because the initially-encoded image has a file size larger than MAXSIZE. In order to comply with the file size, resolution and quality requirements simultaneously, the image should be converted to an output image corresponding to a point within region 76.

Typically, it is preferred to produce an adapted image located on curve 72 and not below the curve, thus fully exploiting the allowed file size and minimizing the degradation of resolution and quality. In the case of point 80A, it can be seen that the image can be adapted to produce another image corresponding to point 84A by reducing only the image quality without reducing the image resolution.

In other cases, however, it may be necessary to reduce the resolution of the image. For example, consider starting point 80B. The encoded image corresponding to point 80B is already at the minimum tolerable quality QMIN. Since it is not possible to further reduce the quality of the image, it is necessary to reduce the image resolution in order to comply with the MAXSIZE requirement. The adapted image corresponds to end point 84B.

In general, image file size can be controlled by modifying the image quality, resolution, or both. Usually, The goal of the adaptation process is to produce a compressed image having the maximal resolution and quality allowed. Different strategies, trade-offs and criteria can be applied to select the appropriate combination of quality and/or resolution change. For example, the image of point 80A can be adapted by modifying both quality and resolution, resulting in a different end point in region 76. The methods and systems described herein perform image adaptation by modifying the quality and/or resolution of the output image in order to comply with target characteristics defined for the adapted output image.

Figure 3:
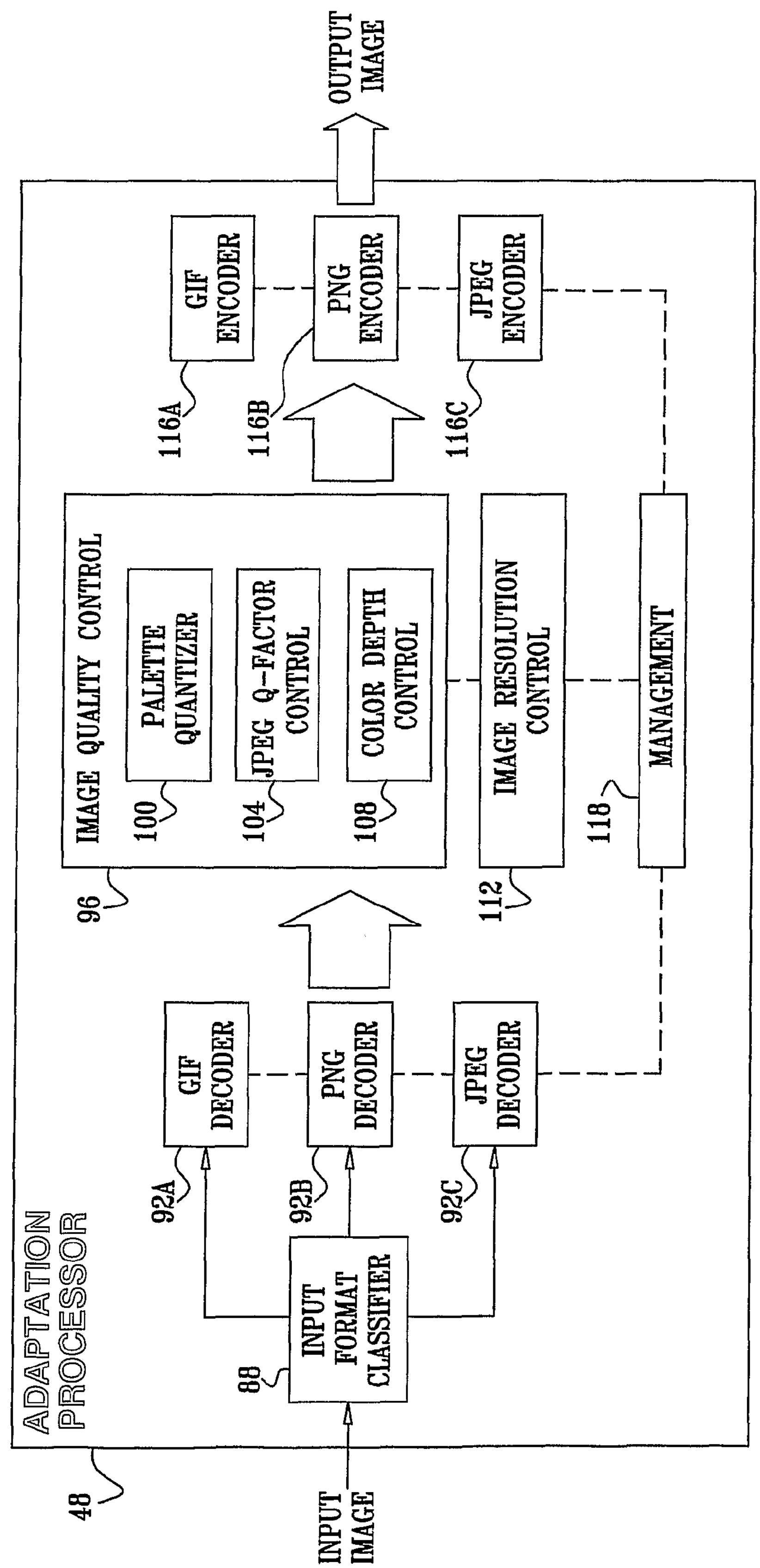
FIG. 3 is a block diagram that schematically illustrates functional elements of an adaptation processor, in accordance with an embodiment of the present invention.

FIG. 3 is a block diagram that schematically illustrates functional elements of adaptation processor 48, in accordance with an embodiment of the present invention. Typically, the different functional elements are implemented as software modules or threads running in processor 48. Alternatively, at least some of these modules may be implemented using dedicated or programmable hardware elements. The functional representation of FIG. 3 is an exemplary representation chosen for the sake of conceptual clarity. In alternative embodiments, the methods carried out by processor 48 may be implemented using different arrangements of functional elements.

In some embodiments, server 40 processes multiple images simultaneously. In these embodiments, server 40 may comprise multiple adaptation processors 48 operating in parallel. Additionally or alternatively, processor 48 may run multiple instances or threads of some or all of the functional elements of FIG. 3, in order to adapt multiple images simultaneously.

In some embodiments, the images handled by server 40, and therefore the input image files provided to processor 48, may conform to different image formats. Some of these formats may comprise paletted image file formats such a GIF and PNG, in which each pixel comprises an index to a color palette. Other input images may conform to bitmap formats such as (BMP), in which each pixel value is represented individually. Some input images may conform to other formats, such as JPEG, tagged image file format (TIFF), wireless bitmap (WBMP) and JPEG 2000. Other input images may conform to animation formats such as animated GIF and multiple-image network graphics (MNG).

Furthermore, some image formats may be operated in different modes. For example, the bitmap (BMP) format, which is normally used to encode images using a true-color representation, can also be used to encode images using a color palette (usually without subsequent compression). As another example, the TIFF format has several modes of operation including both paletted and bitmap representations, either with or without compression. TIFF also supports JPEG compression. The methods and systems described herein may be used to compress and adapt images conforming to any such image format operating at any mode.

Processor 48 comprises an input format classifier 88, which accepts the input image, determines its image format and provides the image to an appropriate image decoder 92. In some embodiments, the format of the input image is provided explicitly along with the image.

Processor 48 may comprise one or more decoders 92, such as a GIF decoder 92A, a PNG decoder 92B and a JPEG decoder 92C. In principle, the decoder accepts the input image and converts it to a raw, true-color image. Typically, each pixel value of the raw image is represented using 24 bits, wherein the red, green and blue (RGB) pixel color components are represented by integer values in the range 0 . . . 255.

In alternative embodiments, the raw image may use any other suitable representation of the raw image. For example, the raw image may use a 48-bit representation in which 16 bits are assigned to each color component. Alternatively, each pixel of the raw image may be represented using 32 bits (24 color bits plus an extra byte for padding or for an alpha channel, as is known in the art) or using 16 bits (5 bits per each color component, plus an additional bit that is either unused or used to improve the quantization of the green component). The raw image may use any internal order of the color components in the representation of pixels (e.g., RGB or BGR) or represent each color component as a separate data array.

Although it is usually convenient to represent the raw image using the raw RGB format, other color spaces can also be used. For example, raw images can be represented using hue, saturation and luminance (HLS) values or using a luminance/chrominance (YUV) format, commonly used for raw video. The description that follows assumes that a 24 bit RGB format is used. The modification of processor 48 to use any of the alternative color spaces and/or different color depths will be apparent to those skilled in the art.

The raw image is compressed using two modules, namely a quality control module 96 and a resolution control module 112. The joint use of modules 96 and 112 in compressing images is described in FIGS. 4-8 below. In principle, processor 48 accepts the target characteristics applicable to the particular image being compressed. These characteristics may comprise the desired output image format, MAXSIZE, QMIN, QMAX, RMIN and/or RMAX constraints, as described above. Processor 48 applies modules 96 and 112 to produce an image whose characteristics comply with the target characteristics.

In some embodiments, processor 48 can be used to produce a compressed output image whose image format is different from the image format of the corresponding input image. For example, a particular destination terminal type may not support certain image formats. In such cases, an image conforming to an image format unsupported by the destination terminal can be converted to an image conforming to another image format that is supported by the terminal.

In some embodiments, the operation of quality control module 96 differs depending on the format of the desired output image format. The appropriate image encoder is also selected according to the desired output format. For example, when the desired output format comprises a paletted format such as GIF or PNG, module 96 uses a palette quantizer 100 that improves the image compressibility by reducing the number of colors in the palette. An exemplary palette quantizer and associated color quantization methods are described, for example, in U.S. Patent Application Publication 2005/0122427 cited above. The color quantization scheme may include a suitable dithering method, such as the well known Floyd-Steinberg algorithm, to improve the visible quality.

As another example, when the desired output image format comprises a JPEG format, module 96 uses a JPEG Q-factor control module 104. Module 104 controls the compression process by modifying an image quality factor, which in turn selects a suitable quantization table in the JPEG encoder. In some embodiments, when the desired output format comprises a bitmap image such as a BMP image, module 96 may use a color depth control module 108 in order to adapt the image by reducing its color depth. Exemplary embodiments of modules 96, 104, 108 and 112 are described in detail further below. A management module 118 manages the operation of processor 48 by controlling the different modules and the flow of images between them.

Adaptation and Compression Method Description

Figure 4:
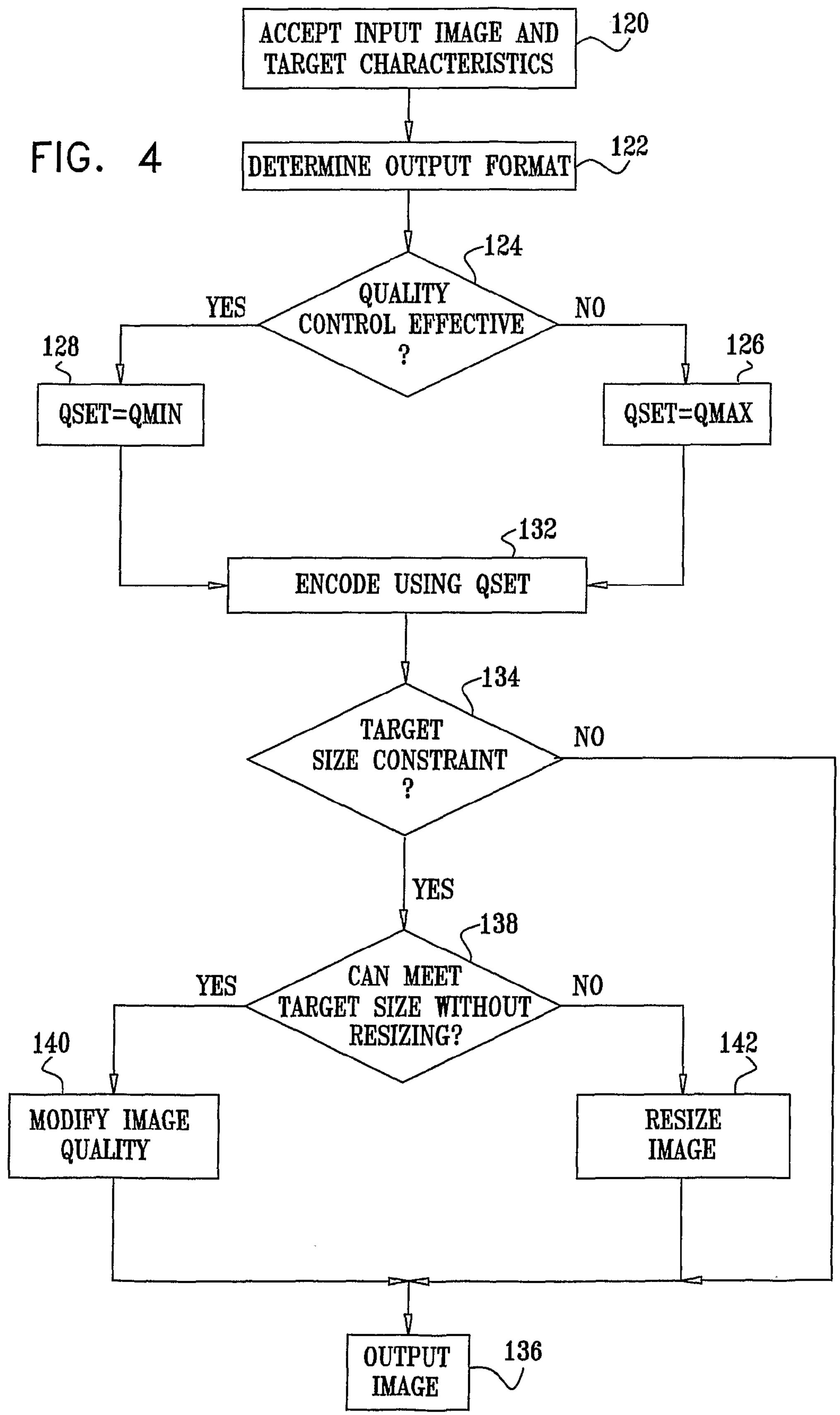
FIG. 4 is a flow chart that schematically illustrates a method for image adaptation and compression, in accordance with an embodiment of the present invention.

FIG. 4 is a flow chart that schematically illustrates a method for image compression, carried out by adaptation processor 48, in accordance with an embodiment of the present invention. The method begins with processor 48 accepting an input image and associated target characteristics, at an input step 120. The input image may conform to any of the image formats supported by processor 48. The target characteristics may comprise the desired output image format, MAXSIZE, QMIN, QMAX, RMIN and/or RMAX as defined above.

In some embodiments, some of the target characteristics may be left undefined. For example, specifying MAXSIZE=0 is interpreted as an unconstrained maximum file size. Specifying QMIN=QMAX or RMIN=RMAX is interpreted as explicitly specifying a single desired quality or resolution value. In some embodiments, the MAXSIZE value is provided with each image, and the quality and/or resolution requirements are common and stored in a configurable parameter file in server 40. The input image is provided to the appropriate decoder 92, which decodes it and produces a raw, true-color RGB image.

Processor 48 determines the desired output image format, at a classification step 122. Processor 48 may apply different types of logic when determining the desired output format. For example, the output format may be determined according to the capability profile of the destination terminal to which the image is addressed, as stored in profile database 52. Additionally or alternatively, the target characteristics provided with the input image at step 120 above may comprise an explicit specification of the desired output format. Further additionally or alternatively, the processor may set the output image format to be the same as the input format, unless otherwise specified. In alternative embodiments, processor 48 may use any other suitable logic to determine the desired output image format. If the output format requires a color palette, a paletted version of the image is produced, as will be described below.

In view of the selected output image format, processor 48 now checks whether quality control is expected to be effective in reducing the image file size, at a quality checking step 124. In general, processor 48 attempts to predict, by applying suitable logic based on the selected output format (and possibly the compression mode), whether reducing the image quality will enable the appropriate encoder 116 to compress the image more effectively.

For example, in some cases reducing the image quality by reducing the number of colors enables significant file size reduction in image formats such as GIF and PNG. As another example, reducing the image quality of a JPEG image by adapting the JPEG quality factor value can effectively reduce the image file size. On the other hand, the file size in some image formats is not significantly affected by quality adaptation. For example, when an image is encoded as an uncompressed bitmap (BMP) image using a color palette, reduction of the palette size (i.e., the number of colors) usually does not reduce the image file size considerably.

Additionally or alternatively, in some cases the MAXSIZE constraint may be unspecified. In such cases, quality control is not required. Further additionally or alternatively, the specified QMIN value may be equal to the specified QMAX, a definition interpreted as a requirement to encode the image at the specified quality QMIN=QMAX, regardless of the MAXSIZE constraint. Thus, for example, processor 48 may conclude that quality control is required and is expected to be effective if a MAXSIZE constraint is specified and the output image format comprises a GIF, PNG or JPEG image, and QMIN≠QMAX. Alternatively, processor 48 may apply any other suitable logic for this purpose.

If quality control is not required, or not expected to be effective, processor 48 sets the current quality setting to be used for encoding the image to be QMAX, at a maximum quality setting step 126. Otherwise, processor 48 sets the current quality setting to be QMIN, at a minimum quality setting step 128. Processor 48 then encodes the raw or raw-paletted image according to QSET, at an initial encoding step 132. QSET can be viewed as the lowest bound on the quality setting, taking into account the image format and the target characteristics. In some embodiments, processor 48 resizes the image to the maximum allowed resolution RMAX before encoding the image at step 132. Thus, the first tested quality/resolution combination is (QMIN, RMAX).

Processor 48 checks whether the target size (MAXSIZE) constraint is specified, at a target specification checking step 134. If no target size has been specified, processor 48 outputs the compressed image (which was encoded at step 132 above at the maximum quality QMAX), at an output step 136, and the method terminates.

Otherwise, processor 48 checks whether it is possible to meet the specified target size constraint using quality modification alone, or whether it is necessary to modify the image resolution as well. Processor 48 checks whether the actual file size of the image encoded at step 132 above is greater than MAXSIZE, at a quality/resolution checking step 138.

If, for example, the actual size of the encoded image is no greater than MAXSIZE and quality control is expected to be effective, as found in step 124 above, processor 48 concludes that there exists an optimum quality level, between QMIN and QMAX, which meets the MAXSIZE constraint. In this case, processor 48 performs an iterative process of determining the best quality level (i.e., that highest quality level in the allowed range that still meets the MAXSIZE constraint), at a quality optimization step 140. The implementation of step 140 differs depending on the specified output image format. An exemplary method for optimizing the quality of paletted images is described in FIGS. 5 and 6 below. An exemplary method for optimizing the quality of JPEG images is described in FIG. 7 below. An exemplary method for optimizing the quality of bitmap images is described further below.

The output of quality optimization step 140 above is an image (having the maximal allowed resolution) encoded according to the appropriate image format at the highest quality level that still meets the target size constraint. Processor 48 outputs the image at output step 136 and the method terminates.

If, on the other hand, the result of quality/resolution checking step 138 is that the actual size of the image (encoded at quality QSET at step 132 above) is greater than MAXSIZE, or that quality control is not expected to be effective in reducing the image file size, processor 48 concludes that it is not possible to meet the target size constraint with quality modification alone. In such a case, processor 48 iteratively reduces the resolution of the image, at a resolution optimization step 142. Processor 48 begins the process with the image encoded resolution optimization step 142 at QSET=QMIN or QSET=QMAX, depending on the outcome of step 124 above. An exemplary resolution optimization method (also referred to as image resizing) is described in FIG. 8 below.

The output of resolution optimization step 142 above is an image encoded according to the appropriate image format, which has a quality QSET and the highest resolution that still meets the target size constraint. Processor 48 outputs the image at output step 136 and the method terminates. In some cases, the constraints imposed by the target characteristics cannot be met even after performing step 142. In such cases, the output image file size does not meet MAXSIZE and a suitable error or warning is issued to the user.

It can be seen that the method of FIG. 4 gives a higher priority to quality reduction of the image at the maximal allowed resolution, as long as it is possible to reach the target file size using quality reduction alone. Otherwise, the image is encoded at the minimum tolerable quality, from which point the remaining file size reduction is achieved by resolution reduction. The present invention is, however, in no way limited to this particular logic. In alternative embodiments, any other suitable logic, order or prioritization may be applied when modifying the resolution and/or quality of the image in order to meet the target size and other target characteristics.

Quality Control Method for Paletted Images

In palleted images, as is known in the art, colors are selected from a color palette comprising a predetermined number of colors, often selected to be a power of 2 for convenience. Each pixel value comprises an index pointing to one of the palette colors to be used for this pixel. When a paletted image is encoded using fewer colors, the corresponding encoder 116 is often able to compress the image (i.e., reduce the image file size) more effectively.

For example, the GIF image format uses the well-known Lempel-Ziv-Welch (LZW) compression algorithm. LZW compression, as is known in the art, is based on identifying and encoding frequently-recurring sequences of pixel values. GIF encoders are particularly effective in compressing images containing frequent repetitions of long pixel value sequences or index values sequences, and specifically repetitions of the same pixel or index value. As such, GIF encoders are generally more effective when the number of colors in the palette is small. There is generally, however, no direct fixed relationship between the palette size and the resulting image file size. This relationship depends on the specific color quantization method used and may differ significantly from one image to another.

Generally, the methods described below are effective for any paletted file format (current or future), which comprises a compression method that performs better given a reduced number of colors. Note, for example, that the BMP format can also encode an image using a palette. Still, since the BMP format commonly does not include compression, the file size of an uncompressed BMP image cannot be reduced considerably by these methods.

The method described in FIGS. 5 and 6 below attempts to optimize the palette size of a paletted image so as to match a given target file size. The method accepts as input an upper limit (denoted NCU) and a lower limit (denoted NCL) defining an allowed range of palette sizes. The method calculates a predetermined number (denoted K) of possible palette sizes distributed over the allowed range. The method then iteratively searches over the K possible sizes to find the largest palette size that still meets the MAXSIZE constraint.

The distribution of possible palette sizes may be either uniform or non-uniform. Typically, the image file size grows more rapidly as a function of the palette size for smaller palettes. Therefore, in some cases it is desirable to use non-uniform distribution of palette sizes. In the following example, when the lower limit NCL is smaller than 64, a non-uniform distribution is used in order to allow finer granularity for smaller palette sizes. Otherwise, a uniform distribution is used. Alternatively, any other suitable threshold value or distribution can be used.

In the present example, when NCL≦64, the K possible palette sizes are given by $$NC(I) = NCL - 1 + \left\lceil \exp\left(\frac{I}{K-1} \cdot \ln(NCU - NCL + 1)\right) \right\rceil \quad [1]$$

and when NCL>64 the Kpossible palette sizes are given by $$NC(I) = NCL - 1 + \text{Round}\left[\frac{I}{K-1} \cdot (NCU - NCL + 1)\right] \quad [2]$$

wherein I=0 . . . K−1. The operator $\lceil x \rceil$ denotes the nearest integer value greater than x. Alternatively, other suitable distributions can also be used.

For example, when K=15, NCL=2 and NCH=256, the following palette sizes are produced by equation [1]:

| | I | | | | | | | | | | | | | | |
|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 |
| NC(I) | 2 | 3 | 4 | 5 | 6 | 9 | 12 | 17 | 25 | 37 | 54 | 79 | 117 | 173 | 256 |

As will be shown below, each iteration of the optimization method comprises encoding the image using one of the possible palette sizes in order to verify the resulting image file size. Since color quantization and encoding operations are considered computationally intensive tasks, it is desirable to reduce the number of iterations needed to determine the optimal palette size. Therefore, in some embodiments, the possible palette sizes are arranged in a binary tree structure, and the iterative search is performed by traversing the tree. A detailed description of the tree traversal method is given in FIG. 6 below. Using the binary tree structure, the optimal palette size out of the K possible sizes can be selected using a maximum of $\lceil \log_2(K) \rceil$ iterations.

Figure 5:
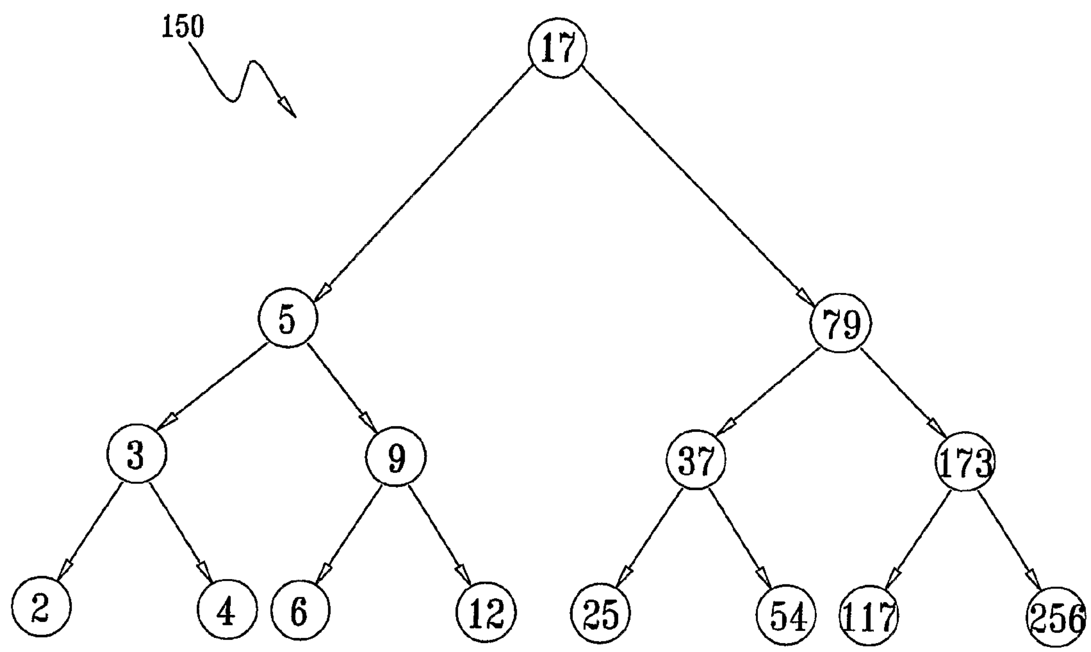
FIG. 5 is a diagram that schematically illustrates a binary search tree used in a method for adjusting the quality of paletted images, in accordance with an embodiment of the present invention.

FIG. 5 is a diagram that schematically illustrates a binary search tree 150 used in a method for adjusting the quality of paletted images, in accordance with an embodiment of the present invention. The tree is populated with the 15 possible palette sizes given in the table above, so as to enable determining the optimal palette size within a maximum of $\lceil \log_2(15) \rceil = 4$ iterations.

The nodes are populated so that at any node, going down and to the right results in a larger palette size NC, whereas going down and to the left results in a smaller NC. In the example of K=15, the root is assigned the mid point value (I=7, NC=17) which divides the remaining 14 palette sizes into two halves. Each Next-level node is assigned a mid point value of the corresponding half, i.e., (I=3, NC=5) and (I=11, NC=79). The population process continues in a similar manner until all possible palette sizes are assigned to tree nodes.

FIG. 6 is a flow chart that schematically illustrates a method for adjusting the quality of paletted images responsively to target characteristics, in accordance with an embodiment of the present invention. The method is typically carried out by palette quantizer 100 in adaptation processor 48. The method can be used to implement quality optimization step 140 of the method of FIG. 4 above, when the desired output image comprises a paletted image file format and the corresponding encoder 116 is expected to compress more efficiently when reducing the number of colors.

The method begins with processor 48 accepting a raw, true-color image from one of decoders 92, at a raw input step 154. The decoded raw image is usually resized to the maximum allowed resolution RMAX, so as to start the method from a starting point having maximal resolution. This can be done externally before module 96. Reduced resolution also saves calculations in the color quantization and encoder modules.

The processor also accepts target size (MAXSIZE) and color range (NCL, NCU) target characteristics, at a characteristics acceptance step 156. When NCL and NCU are not provided, a default range can be used, such as setting NCL=16 and NCU=256. In some embodiments, the desired output format is also provided.

Processor 48 first converts the true-color image to a high quality paletted image, at an initial palette conversion step 158. The processor quantizes the raw image to produce a palette having the maximum number of colors defined in the system, denoted N, typically comprising 256 colors. Alternatively, the palette having N colors may be produced a-priori (either using quantizer 100 or using another palette quantizer external to module 96) and provided together with the raw image at step 154 above. In some embodiments, Nis selected to be equal to NCU, so as not to exceed the maximum allowed quality.

The image used for generating the palette is usually a raw decoded image (decoded by one of the decoders 92) that was also resized to the maximal permitted resolution RMAX When the input file format comprises a palette format such as GIF, an alternative implementation of steps 154 and 158 above is to use the palette of the input image and convert the resized image to conform to this palette. Methods for converting an image to conform to a desired palette are described further below.

Processor 48 then checks whether palette size optimization is required, at an optimization checking step 160. For example, optimization is not required when no target size constraint is specified or when NCL=NCU. In such cases, the processor encodes the image using a palette having NCU colors, at an NCU encoding step 162, and the method terminates.

If palette size optimization is required, processor 48 determines the K possible palette sizes, at a possible size calculation step 164. The K values are determined responsively to the range defined by NCL and NCU using equations [1] and/or [2] above. The processor constructs a binary tree having K nodes, such as tree 150 of FIG. 5 above, and populates the calculated possible palette sizes into the binary tree. The processor then initiates a traversal of the populated binary tree beginning at the root of the tree, at a traversal initiation step 166.

Processor 48 extracts a current palette size (i.e., a current number of colors) from the currently-visited tree node, at a current size extraction step 168. The processor encodes the raw image using a palette having the current palette size, at a current encoding step 170. The processor may use one of encoders 116 (according to the output format), or an additional encoder within quantizer 100 for this purpose. The palette having the current size and the accompanying paletted image are produced using palette quantizer 100. Processor 48 records the current palette size and file size used. The processor compares the actual file size of the encoded image with the specified target size (MAXSIZE), at a size comparison step 172.

If the actual size is larger than the target size, the palette size should be reduced. Thus, processor 48 proceeds to traverse the next-level left-hand-side node in the tree (i.e., proceeds downwards and to the left in the tree), at a current size reduction step 174. If, on the other hand, the actual size is smaller than or equal to the target size, it may be possible to increase the palette size. Thus, processor 48 records the current palette size and file size at a current recording step 176. Processor 48 then proceeds to traverse the next-level right-hand-side tree node (i.e., proceeds downwards and to the right in the tree), at a current size increase step 178.

Processor 48 checks whether it had reached the bottom, or the leaves, of the binary tree, at a traversal completion checking step 180. If the bottom of the tree was not reached, the method returns to step 168 above to continue traversing the tree. Otherwise, when a leaf of the particular branch traversed was reached, the processor outputs the last recorded palette size and corresponding file size which still met the MAXSIZE constraint, at an output step 182. This value, last recorded at step 170 or 176 above, comprises the largest palette size out of the K possible sizes that meets the target size requirement.

In some embodiments, the processor outputs the image encoded using the optimal palette size (i.e., the palette size cached at step 170 or 176 above) in step 182. In these embodiments, the processor caches the encoded image itself at step 176 and on the first visit (i.e., the tree root traversal) at step 170.

In some embodiments, such as when the method of FIG. 6 is implemented as step 140 of the method of FIG. 4, a version of the image at QMIN (i.e., using NCL colors) is already available. In these embodiments, the binary tree can be produced starting from NCL+1. The image encoded at QMIN can be stored and taken as the final output in case the tree traversal reaches NCL+1 without meeting the MAXSIZE constraint.

In some cases, particularly when the color range (NCU−NCL) is small, multiple nodes may be assigned the same palette size. Although the method of FIG. 6 above provides the correct result in these situations, it is possible to improve the method so as to avoid encoding the image several times with the same palette size. In some embodiments, when traversing the tree, each current palette size is recorded in an auxiliary vector. At step 170 above, before encoding the image, processor 48 checks the auxiliary vector. If, according to the vector, the image was already encoded using the current palette size, the processor does not encode the image. Rather, the processor continues to traverse the next level node of the tree in the same direction as in the previous step. Since there are at most $\lceil \log_2(K) \rceil$ iterations in the search, the size of the auxiliary vector can be limited to $\lceil \log_2(K) \rceil$. In alternative embodiments, the method can verify that each palette size is not assigned more than once in the first place by reducing the number of levels in the tree and/or by using a non-complete tree.

Although the method of FIG. 6 used a tree structure to reduce the number of search iterations over the range of possible palette sizes, any other suitable method can be used to search the range for the optimal palette size.

Quality Control Method for JPEG Images

Figure 7:
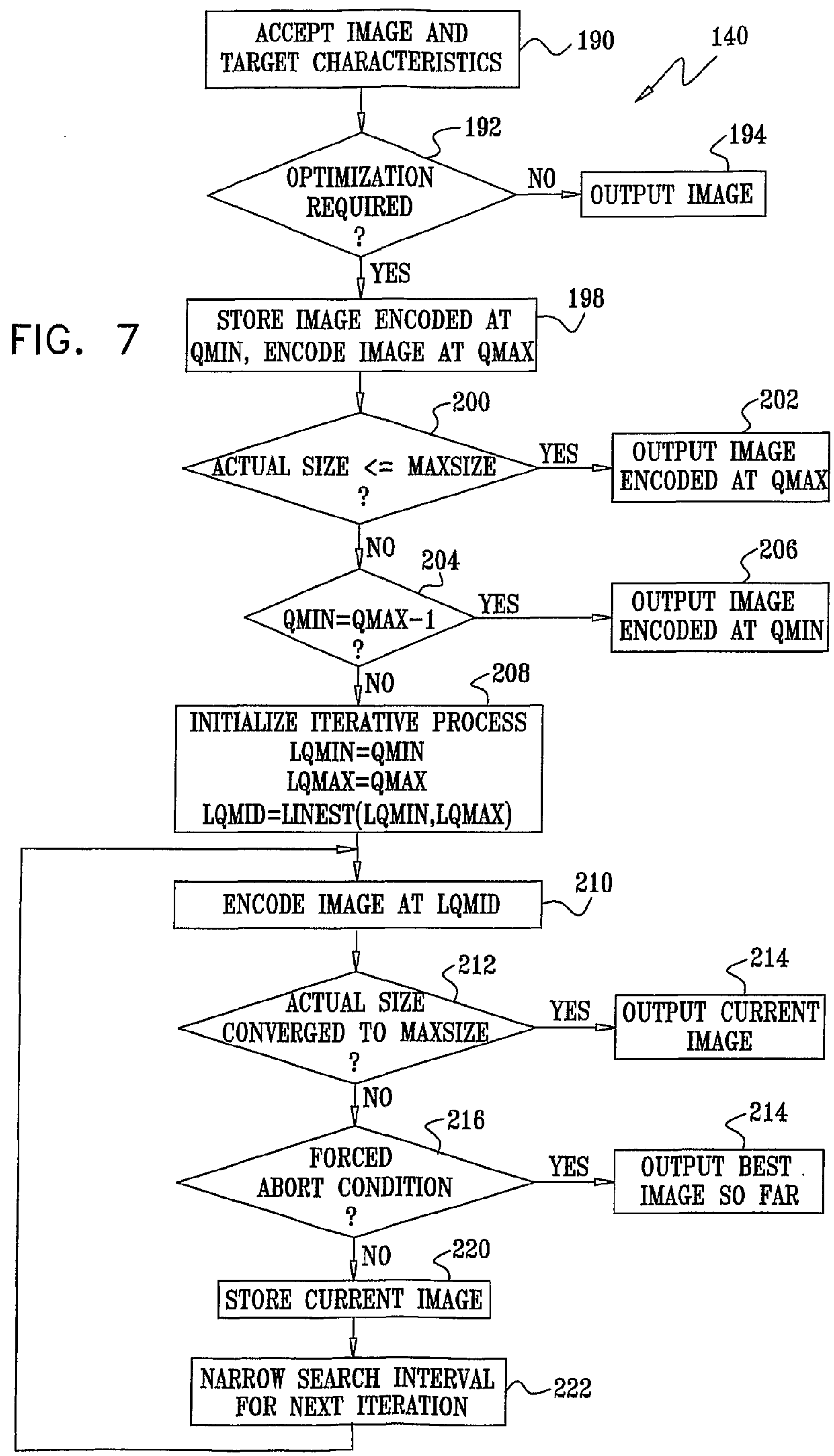
FIG. 7 is a flow chart that schematically illustrates a method for adjusting the quality of JPEG images, in accordance with an embodiment of the present invention.

FIG. 7 is a flow chart that schematically illustrates a method for adjusting the quality of JPEG images responsively to target characteristics, in accordance with an embodiment of the present invention. The method is carried out by JPEG Q-factor control module 104 in processor 48. The method can be used to implement quality optimization step 140 of the method of FIG. 4 above, when the desired output image file format comprises the JPEG format.

The JPEG standard cited above enables the use of configurable quantization tables, which determine the depth of the compression. Typically, deeper compression produces a smaller file size having a lower quality. The method of FIG. 7 uses a quality factor, which specifies the target quality of the compressed image to the JPEG encoder. The quality factor is typically an integer number between 0 and 100. A higher quality factor normally translates to a higher quality image having a larger file size, and vice versa.

The method described below modifies the quality factor iteratively in order to find the highest quality factor value that still meets the target size constraint MAXSIZE. The actual image quality achieved at a given quality factor depends on the specific quantization tables used in the JPEG encoder. The quality factor may be used to select one of several predefined quantization tables and/or modify a single quantization table in order to achieve the desired quality. Exemplary quantization tables are specified in annex K of the JPEG standard cited above. In some embodiments, different quantization tables having respective different quality factors and compression ratios can be defined and applied iteratively.

The method begins with processor 48 accepting a raw, true-color image from one of decoders 92, at an input step 190. In some embodiments, the decoded image is also resized to the maximal allowed resolution RMAX. The processor also accepts a target size (MAXSIZE) constraint and a range of quality factors to be searched. The quality factor range is specified by a minimum quality factor QMIN and a maximum quality factor QMAX. When a specific quality factor range is not provided, a default range may be used, such as between 40 and 75.

The method also assumes that a version of the image, resized to RMAX and encoded at the minimum quality QMIN, is available. When implementing the current method as part of the method of FIG. 4 above, an image encoded at QMIN is produced at step 132 of FIG. 4. If such an image is not available, processor 48 can use JPEG encoder 116C or another JPEG encoder internal to module 104 (not shown) to produce it at this stage.

Processor 48 checks whether quality optimization is required, at an optimization checking step 192. Quality optimization may not be required, for example, because the target size has already been met when encoding the image at QMIN (i.e., the actual file size is already below MAXSIZE within a predefined tolerance, as described below), because the target size is not specified, or because the quality factor range comprises a single value (i.e., QMIN=QMAX). In all such cases, processor 48 outputs the current image at an initial output step 194, and the method terminates.

When quality optimization is required, processor 48 stores the image encoded at QMIN and encodes the raw image at QMAX, at a QMAX encoding step 198. The processor now checks whether the target size constraint was met by the image encoded at QMAX, at a target size checking step 200. If the image encoded at QMAX already meets the target size constraint, processor 48 outputs this image at a QMAX output step 202, and the method terminates.

The processor now checks whether the quality range (i.e., QMAX−QMIN) is larger than a single unit, at a range checking step 204. If the difference between QMIN and QMAX is only a single unit (QMIN=QMAX−1), processor 48 concludes that no further improvement is possible beyond encoding the image at QMIN. The processor outputs the image encoded at QMIN, at a QMIN output step 206, and the method terminates.

At this stage, processor 48 concludes that an optimal quality factor, which still meets the MAXSIZE constraint, exists between QMIN and QMAX. At steps 208-222 below, processor 48 performs an iterative search process in order to determine this optimal quality factor. In each iteration, a search interval of quality factor values [LQMIN,LQMAX] is defined, with the optimal quality factor known to reside within this interval. The size of the interval is gradually reduced until the optimal quality factor is found.

The search interval is initially set to the entire allowed range of quality factor values, i.e., [LQMIN,LQMAX]=[QMIN,QMAX], at an interval initialization step 208. The known image file size values corresponding to LQMIN and LQMAX are denoted SL and SH, respectively. Processor 48 calculates a middle quality factor, denoted LQMID, using a linear interpolation of (LQMIN,SL) and (LQMAX,SH). For example, in some embodiments, when SH>SL, LQMID is calculated by $$LQMID = \text{Round}\left\{ LQMIN + (LQMAX - LQMIN) \cdot \frac{MAXSIZE - SL}{SH - SL} \right\} \quad [3]$$

and when SH≦SL, LQMID is calculated by $$LQMID = \frac{1}{2}(LQMIN + LQMAX) \quad [4]$$

The actual image file size at quality factor value LQMID is denoted SM. Alternatively, LQMID can be determined by halving the interval [LQMIN,LQMAX] using only equation [4], regardless of the values of SH and SL.

Processor 48 encodes the image using LQMID as the quality factor value, at a JPEG encoding step 210. (The case of SH<SL is considered but is not the commonly-occurring case. In most cases, when the quantization tables of the JPEG encoder are selected properly, a higher quality factor translates to a larger file size, and vice versa.)

The processor then checks whether the resulting actual file size (SM) converges to the target file size requirement, at a convergence checking step 212. In some embodiments, if SM is smaller than MAXSIZE but within 10 percent of MAXSIZE, it is considered to have converged to the target size requirement. Alternatively, other suitable threshold values and/or criteria can be used to determine whether SM is sufficiently close to MAXSIZE. If the currently-encoded image file size has converged to the desired size constraint, processor 48 outputs the currently-encoded image, at a current output step 214, and the method terminates.

Otherwise, processor 48 checks for forced abort conditions, at an abort checking step 216. When a forced abort condition is met, processor 48 outputs the best image encoded so far, at an aborted output step 218, and the method terminates. A forced abort condition may comprise, for example, an upper bound on the number of search iterations, such as eight iterations. When the maximum bound is reached, the method terminates regardless of how closely SM has converged to MAXSIZE.

As another example, a forced abort condition may limit the minimum size of the search interval (LQMAX−LQMIN). In other words, when the search interval becomes smaller than the predetermined threshold, the method terminates with the best quality factor achieved so far. In general, forced output conditions reduce the number of iterations performed at the expense of a lower quality result. In some embodiments, a warning message may be issued if the actual file size of the image does not meet the convergence criteria of step 212 above when the method is aborted.

Processor 48 now caches the current image encoded at quality factor SM as the best result achieved so far, at a caching step 220. The processor then narrows the search interval for the next iteration, at an interval narrowing step 222. In some embodiments, the processor evaluates the ratio of the actual file size of the currently-encoded image divided by MAXSIZE. This ratio is referred to as SIZERATIO. If SIZERATIO>1, the search interval of the next iteration is narrowed by setting LQMAX=LQMID and SH=SM. If SIZERATIO≦1, the interval is narrowed by setting LQMIN=LQMID and SL=SM. Processor 48 recalculates a new value of LQMID using equations [3] and [4] above.

In some embodiments, the resulting value of LQMID is hard-limited to the updated interval [LQMIN,LQMAA] to ensure the new value does not exceed the interval limits. In some embodiments, if SIZERATIO>1, the updated value of LQMID is decremented by 1, in order to avoid scenarios in which LQMID alternates between two values without converging. The method then loops back to JPEG encoding step 210 above to encode the image according to the updated quality factor value LQMID.

The method described above used an iterative process that gradually narrows down the range of quality factor values until the resulting image file size converges to the desired target size. In alternative embodiments, other methods of determining the optimal quality factor value can be used.

For example, an average relationship between image file size and quality factor can be estimated a-priori by collecting the ratios over multiple images. The average relationship is then used as an initial condition of the quality factor. From this point, the quality factor is incremented or decremented by a predetermined step size, according to the actual image file size achieved. The iterations are continued until the file size reaches satisfactory convergence to MAXSIZE. In some embodiments, when the updating of the quality factor changes sign (i.e., goes from incrementing to decrementing or vice versa) the step size is halved.

Quality Control for Bitmap Images using Color Depth Adaptation

In some cases, it is desirable to adapt the quality of bitmap images, such as BMP images, to match a given MAXSIZE requirement. As noted above, each pixel value in a true-color image is typically represented using 24 bits, with 8 bits allocated to represent each of the red, green and blue (RGB) color components. Color depth adaptation can generally be applied when other solutions, such as palette size adaptation, are not applicable, and when the desired output format supports varying color depth.

In some embodiments, color depth control module 108 of processor 48 modifies the quality of a bitmap image by reducing the number of bits used to represent each color component. This process is often referred to as reduction of the image color depth. For example, setting the color depth to 16 bits per pixel (e.g., using 5 bits for each color component, plus one unused bit) reduces the image file size by a factor of approximately 16/24=2/3 in comparison with a 24 bit true-color image. The exact reduction factor may vary slightly due to header overhead.

For example, in order to reduce the color depth from 8 bits to 5 bits per color component, the three least significant bits of each color component can be zeroed. This operation can be viewed as a rougher color quantization scheme. A suitable dithering method, such as the well known Floyd-Steinberg algorithm, can be additionally applied to improve the visible quality.

In this method QMIN refers to the minimal tolerable color-depth in the system and QMAX is the maximal color depth allowed. The range [QMIN, QMAX] comprises distinct color depth values supported by the encoder.

Processor 48 may apply any suitable process to determine the optimal color depth setting of a given image in the range [QMIN, QMAX], which provides the best achievable quality while meeting the MAXSIZE constraint and other target characteristics defined for the given image. The color depth adaptation may be combined with resolution adaptation, in a similar manner to the method of FIG. 4 above.

Resolution Control Method Description

FIG. 8 is a flow chart that schematically illustrates a method for adjusting image resolution in order to meet target characteristics, in accordance with an embodiment of the present invention. The method is typically carried out by resolution control module 112 of processor 48, and may be used to process images conforming to any format, such as paletted images, JPEG images and bitmap images. Since in this method the input image is first converted to a raw bitmap representation, any desired image format, including currently-unknown future formats, may be resized using this method.

The method can be used to implement resolution optimization step 142 of the method of FIG. 4 above. When used as part of the method of FIG. 4, resolution adjustment is performed if the required image file size cannot be reached with quality adjustment alone. In some embodiments, initial image resizing (e.g., resizing to the maximum permitted resolution RMAX) is performed a-priori. The method of FIG. 8 is then used to apply additional resolution reduction in order to meet MAXSIZE.

In principle, the method of FIG. 8 comprises an iterative process that searches a range of possible resolutions (i.e., number of pixels along the width or height of the image) to find the highest resolution that still meets the target file size requirement. The method operates on raw (RGB) images, as produced by decoders 92 regardless of the input format.

The method begins with processor 48 accepting an original resolution image and associated target characteristics, at a resizing input step 230. The method assumes that if the desired output image format requires a palette, the palette and paletted image are already available. Processor 48 checks whether or not the original resolution image comprises a paletted image, at a first palette checking step 232. If the original resolution image is not paletted (i.e., the image comprises an RGB raw image) the processor stores the raw image, at an input storage step 234. If the original resolution image comprises a paletted image, processor 48 converts it to RGB format, at an RGB conversion step 236. The processor stores the RGB image as well as the original palette of the original resolution image. Alternatively, both RGB and paletted versions of the paletted image are already available at step 230 and only stored at step 236.

Processor 48 now initializes the variables to be used in the iterative search process, in a resizing iteration initialization step 238. Several variables are used in the process. The target characteristics may comprise a parameter denoted MINPIXPERDIM, specifying the minimum number of pixels per each image dimension. An exemplary default value of MINPIXPERDIM is 50 pixels. Another parameter denoted MINRESIZERATIO specifies the minimum resizing ratio per a single dimension. A typical default value for MINRESIZERATIO is 25%, corresponding to a 1:16 reduction in the image area. HSIZE and VSIZE denote the original horizontal and vertical resolutions (number of pixels) of the original resolution image, respectively. Additionally, there may be a constant system definition of another threshold limiting the minimum number of pixels per each image dimension, denoted CONSTMINPIXELS.

A variable denoted MINLEN defines a minimum resolution in any single dimension of the image, to be used in the resizing process. MINLEN is typically set to the maximum among (1) MINPIXPERDIM, (2) CONSTMINPIXELS and (3) round{min(VSIZE,HSIZE)*MINRESIZERATIO}.

A variable LEN is set to LEN=min(VSIZE,HSIZE). In general, the iterative process considers the smaller dimension of the image when resizing. The larger dimension is resized by the same ratio so as to preserve the aspect ratio of the image.

The processor performs an iterative search for the optimal resolution by defining a search interval [LMIN,LMAX] of resolution values. In each iteration, a middle point denoted LMID within the interval is calculated. The input image is resized to the resolution LMID and the resulting encoded image file size is compared against MAXSIZE. Based on the comparison, the search interval is narrowed down for the next iteration. Iterations continue until the actual image file size converges to MAXSIZE or until a forced abort condition is encountered.

The initial variable setting is LMAX=LEN and LMIN=MINLEN. LMID is calculated in three steps:

$$LMID=LEN/\sqrt{SIZERATIO}$$

$$LMID=LMID\&0xfff8$$

$$LMID=\max(LMID,LMIN) \quad [5]$$

wherein SIZERATIO is the ratio between the file size of the original size image and MAXSIZE. When the method of FIG. 8 is used as step 142 of the method of FIG. 4 above, the original size image comprises the image encoded at quality QSET at step 132 of FIG. 4 above. SIZERATIO is later updated during the iterative process.

As an initial estimate, equation [5] assumes that the image file size of the resized image will decrease proportionally with the image area. Therefore, LMID is estimated as LEN divided by the square root of this ratio. LMID is then quantized to 8 pixel granularity. Then, LMID is hard-limited with LMIN to ensure it does not fall outside the interval.

Processor 48 now resizes the image using the resolution LMID, at a resizing step 240. Typically, the resolution of the smaller dimension of the image is set to LMID, and the larger dimension is resized by the same ratio as the smaller dimension, in order to preserve the aspect ratio of the image.

Resizing of the image can be performed using any suitable resizing method or tool known in the art. For example, Intel Corporation (Santa Clara, Calif.) offers a software library called Integrated Performance Primitives (IPP) that includes functions for image resizing. Details regarding the IPP library can be found at www.intel.com/cd/software/products/asmo-na/eng/perflib/ipp/index.htm. The image resizing process often comprises interpolation process for determining the new output pixel values. Exemplary interpolation methods are described by Keys in a paper entitled "Cubic Convolution Interpolation for Digital Image Processing," IEEE Transactions on Acoustics, Speech and Signal Processing (ASSP), (29:6), December 1981, pages 1153-1160, which is incorporated herein by reference.

Processor 48 checks whether the desired output format comprises a paletted format, at a second palette checking step 242. If the output format does not comprise a paletted format, the processor encodes the resized image and records the resulting actual image file size, in order to evaluate the actual file size, at a resized encoding step 244. Processor 48 encodes the resized image using one of encoders 116, depending on the desired output format. (The steps taken when the image comprises a paletted image are described further below.) In some embodiments, if the actual size of the encoded resized image is smaller than MAXSIZE, processor 48 caches the image. As will be described below, under certain conditions the processor may output the cached image as the best achievable result.

The processor then compares the actual image file size of the resized image with the target file size (MAXSIZE), at a resized convergence checking step 246. In some embodiments, the processor assumes that the actual file size successfully converged to MAXSIZE if the actual file size is smaller than or equal to, but within 20 percent of MAXSIZE. Alternatively, any other suitable threshold or criterion can be used.

If the actual file size has converged successfully to MAXSIZE, processor 48 outputs the encoded resized image along with its actual file size, at a resized output step 248, and the method terminates.

If convergence was not reached, processor 48 checks whether the minimum allowed resolution (MINLEN) was reached, at a minimum resolution checking step 250. If the minimum resolution was reached without successfully converging to MAXSIZE, the processor concludes that no solution is possible. The processor outputs an error message, at a failure step 252, and the method terminates.

If the minimum resolution was not yet reached, processor 48 updates the search interval for the next iteration, at a resolution interval updating step 254. The interval updating depends on the value of SIZERATIO (the ratio of the actual file size of the encoded resized image divided by MAXSIZE). If SIZERATIO>1, the search interval of the next iteration is narrowed by setting LMAX=LMID. If SIZERATIO≦1, the interval is narrowed by setting LMIN=LMID. Processor 48 recalculates a new value of LMID. In some embodiments, the updated LMID value is calculated as a weighted average of LMAX and LMIN, using a weight factor $0<\alpha\leqq 1$ that depends on SIZERATIO:

$$LMID=LMAX\cdot\alpha+LMIN\cdot(1-\alpha) \quad [6]$$

For example, if SIZERATIO>1, $\alpha$ is set to $\alpha$=1/SIZERATIO, so that as SIZERATIO decreases towards unity (i.e., as the actual file size approaches MAXSIZE), $\alpha$ increases towards unity, causing LMID to approach LMAX. If SIZERATIO≦1, $\alpha$ is set to $\alpha$=1−SIZERATIO, so that as SIZERATIO increases towards unity, $\alpha$ approaches zero, causing LMID to approach LMIN.

Processor 48 checks for forced abort conditions, at a resizing forced abort checking step 256. For example, an abort condition may specify that if two consecutive values of LMID are equal, no further improvement is possible and that the iterative process should be aborted. Another abort condition may state that if the number of iterations exceeds a predetermined limit (such as 8 iterations) the process should be aborted.

If a forced abort condition is encountered, the processor outputs an error message at failure step 252, and the method terminates. In some embodiments, at step 252, if the actual size is smaller than MAXSIZE, but not within the convergence criteria of step 246 above, the processor only outputs a warning message. In such cases, the processor may also output the image cached at step 244 above as the best achievable result, as long as its file size is smaller than MAXSIZE. In some embodiments, the processor may output the cached image even if its file size exceeds MAXSIZE, and allow higher level processes and/or applications to determine whether to forward the cached image to the terminal.

If no abort condition is detected, processor 48 recovers the input image stored at step 234 or 236 above, and loops back to resizing step 240 above to perform the next iteration.

We shall now return to describe the process of resizing a paletted image. If the outcome of second palette checking step 242 above is that the output format comprises a paletted image format, the resized RGB image is converted to a paletted image (using the same palette stored in step 236 above), in order to encode it and verify the resulting file size. A special case exists when the paletted image comprises a black and white image (i.e., the palette has two colors). Processor 48 checks whether the palette size of the image has more than two colors, at a black and white checking step 261.

If the palette has more than two colors (i.e., the image comprises a color or grey-scale image in which R=G=B), the RGB image is converted to a paletted format having the original stored palette, at an RGB to paletted conversion step 262. Since the resizing process performed at step 240 above involves interpolation between pixel values, the resized RGB image may contain colors that do not appear in the original palette.

In some embodiments, newly-appearing colors are replaced by the closest matching color that does appear in the original palette. Determining the closest color in the original palette may be performed by searching the entire palette, which may be computationally intensive for large palettes and/or images. Alternatively, the processor may hold an inverse palette table, which holds for each RGB color combination the closest color in the palette. In many practical cases, the size of the inverse palette table may be reduced by allocating fewer bits (for example 5 bits) to each RGB color component. Any suitable distance function can be used to calculate the closest color to each RGB combination. For example, an L1 or Manhattan distance, as is known in the art, can be used for this purpose.

If the outcome of black and white checking step 261 above is that the original palette has only two colors, processor 48 constructs a new palette for the grey level image, at a palette construction step 263. Note that although the original image had, only two colors, the resized image following step 240 above typically comprises multiple grey levels because of the interpolation operations. Typically, the processor starts from an empty palette. The processor scans the pixels of the resized grey level image and adds any newly-encountered grey level to the palette (which, in any case, should not exceed 256 levels).

The processor then quantizes the new palette according to the minimum quality (minimum number of colors) QMIN, at a grey quantizing step 264. The processor converts the grey-level image and palette to RGB format, at a grey palette to RGB conversion step 266. The processor stores the grey level image and the grey level palette, at a grey storage step 268. The grey level image and grey level palette will later be used in subsequent resizing iterations, thus replacing the image and palette previously stored at step 236 above. From-this point, the processor continues to follow the resizing method at resized encoding step 244 above.

Note that for black and white images, steps 263-268 are typically performed only in the first resizing iteration. In subsequent iterations, the palette no longer has only two colors.

Although the embodiments described herein mainly refer to adaptation of images in mobile networks, the principles of the present invention can be used to adapt additional media types such as animated GIF and MNG images to comply with target characteristics. For example, the quality of an animated GIF frame sequence can be adapted by constructing a global color palette that encodes the colors of all animation frames in the sequence. Resolution control of animated GIF sequences can be performed by resizing all frames by the same ratio. To reduce the computational complexity associated with iteratively resizing the entire sequence, resizing can be attempted at several predetermined ratios until convergence is reached.

The methods described herein can also be suitable for adapting images represented in vector graphics formats such as the scalable vector graphics (SVG) format. Adapting an SVG image can be performed, for example, by converting the SVG format to a raw RGB format using a suitable decoder 92, and than following the methods described hereinabove.

The principles of the present invention can be used to adapt various video file formats, as well. In order to compress a video clip into a file having a specified target size, the target size can be translated to a target bit-rate constraint. A rate control module, typically part of the video encoder, attempts to achieve the target bit rate so as to meet the target MAX-SIZE. If rate adaptation fails, resolution adaptation can be applied to all video frames in the clip, iteratively resizing all frames by the same ratio and encoding the resized sequence.

Although the embodiments described herein mainly refer to mobile networks, the methods and systems described herein can be in other types of communication networks, applications and terminals. Additionally, the methods and systems described herein can be used in other applications in which it is desirable to limit the image file size, such as image archiving and storage applications.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:

1. A computer-implemented method for image adaptation, comprising:

accepting a digitally-represented input image;

accepting a target size requirement; and modifying the input image by reducing at least one of a resolution of the input image and a quality of the input image, the quality defining an amount of information allocated to represent each pixel value of the input image, so as to produce a compressed output image meeting the target size requirement, wherein accepting the input image comprises accepting a minimum tolerable quality requirement, and wherein modifying the input image comprises reducing the quality of the input image while meeting the minimum tolerable quality requirement, and reducing the resolution of the input image only when reducing the quality of the input image while meeting the minimum tolerable quality requirement does not meet the target size requirement.

2. The method according to claim 1, wherein accepting the input image comprises accepting the input image at a media adaptation server in a communication system, wherein the target size requirement relates to at least one of a capability of a destination terminal in the communication system to which the input image is addressed and a network limitation of the communication system, wherein modifying the input image comprises producing the compressed output image so as to match the capability, and comprising transmitting the compressed output image to the destination terminal.

3. The method according to claim 1, wherein the input image conforms to an input image file format, and wherein modifying the input image comprises producing the compressed output image conforming to an output image file format different from the input image file format.

4. The method according to claim 1, wherein the input image conforms to an input image file format wherein accepting the input image comprises accepting a desired output image file format, wherein modifying the input image comprises decoding the input image responsively to the image file format to produce a raw true-color image, and converting the raw true-color image to the compressed output image having the output image file format.

5. The method according to claim 4, wherein the desired output image format comprises a paletted image file format, and wherein reducing the quality of the input image comprises determining a palette size of an output color palette of the compressed output image causing the compressed output image to meet the target size requirement.

6. The method according to claim 5, wherein determining the palette size comprises defining a plurality of possible palette sizes and iteratively searching over the plurality for an optimal palette size having a highest number of colors from among the plurality while meeting the target size requirement.

7. The method according to claim 6, wherein defining the plurality of the possible palette sizes comprises arranging the possible palette sizes in a binary search tree, and wherein searching over the plurality comprises traversing the binary search tree so as to reduce a number of search iterations.

8. The method according to claim 4, wherein the desired output image file format comprises a Joint Photographic Experts Group (JPEG) image file format, and wherein reducing the quality of the input image comprises determining an optimal JPEG quality factor value for encoding the compressed output image while meeting the target size requirement.

9. The method according to claim 8, wherein determining the optimal quality factor value comprises iteratively narrowing a search interval of quality factor values in search of a quality factor value satisfying a predetermined convergence condition related to the target size requirement.

10. The method according to claim 9, wherein iteratively narrowing the search interval comprises detecting a forced abort condition before determining the optimal quality factor value, and aborting the method responsively to the detected condition.

11. The method according to claim 8, wherein reducing the quality of the input image comprises determining a quantization table responsively to the optimal quality factor value and producing the output image encoded using the determined quantization table.

12. The method according to claim 4, wherein the desired output image file format comprises a bitmap image format, and wherein reducing the quality of the input image comprises determining a number of bits used to encode each pixel value of the output image.

13. The method according to claim 4, wherein the desired output image file format comprises a paletted image file format, and wherein reducing the resolution of the input image comprises converting the input image to a raw true-color image, reducing the resolution of the raw true-color image to produce a resized image, and encoding the resized image in accordance with the paletted image file format to produce the compressed output image.

14. The method according to claim 1, wherein reducing the resolution of the input image comprises iteratively searching over a range of allowed resolution values for a highest resolution value meeting the target size requirement.

15. Apparatus for image adaptation, comprising:

an interface, which is arranged to accept a digitally-represented input image and a target size requirement; and a processor, which is arranged to modify the input image by reducing at least one of a resolution of the input image and a quality of the input image, the quality defining an amount of information allocated to represent each pixel value of the input image, so as to produce a compressed output image meeting the target size requirement, wherein the interface is arranged to accept a minimum tolerable quality requirement, and wherein the processor is arranged to reduce the quality of the input image while meeting the minimum tolerable quality requirement, and to reduce the resolution of the input image only when reducing the quality of the input image while meeting the minimum tolerable quality requirement does not meet the target size requirement.

16. The apparatus according to claim 15, wherein the interface is arranged to accept the input image from a communication system, wherein the target size requirement relates to at least one of a capability of a destination terminal in the communication system to which the input image is addressed and a network limitation of the communication system, wherein the processor is arranged to produce the compressed output image so as to match the capability, and to send the compressed output image via the interface to the communication system in order to transmit the compressed output image to the destination terminal.

17. The apparatus according to claim 15, wherein the input image conforms to an input image file format, and wherein the processor is arranged to produce the compressed output image conforming to an output image file format different from the input image format.

18. The method according to claim 15, wherein the input image conforms to an input image file format, and wherein the processor is arranged to accept a desired output image file format, to decode the input image responsively to the input image file format to produce a raw true-color image, and to convert the raw true-color image to the compressed output image having the output image file format.

19. The apparatus according to claim 18, wherein the desired output image file format comprises a paletted image file format, and wherein the processor is arranged to determine a palette size of an output color palette of the compressed output image so causing the compressed output image to meet the target size requirement.

20. The apparatus according to claim 19, wherein the processor is arranged to define a plurality of possible palette sizes and to iteratively search over the plurality for an optimal palette size having a highest number of colors from among the plurality while meeting the target size requirement.

21. The apparatus according to claim 20, wherein the processor is arranged to arrange the possible palette sizes in a binary search tree and to traverse the binary search tree so as to reduce a number of search iterations.

22. The apparatus according to claim 18, wherein the desired output image file format comprises a Joint Photographic Experts Group (JPEG) image file format) and wherein the processor is arranged to determine an optimal JPEG quality factor value for encoding the compressed output image while meeting the target size requirement.

23. The apparatus according to claim 22, wherein the processor is arranged to determine the optimal quality factor value by iteratively narrowing a search interval of quality factor values in search of a quality factor value satisfying a predetermined convergence condition related to the target size requirement.

24. The apparatus according to claim 23, wherein the processor is arranged to detect a forced abort condition before determining the optimal quality factor value, and to abort determining the optimal quality factor value responsively to the detected condition.

25. The apparatus according to claim 22, wherein the processor is arranged to determine a quantization table responsively to the optimal quality factor value and to produce the output image encoded using the determined quantization table.

26. The apparatus according to claim 18, wherein the desired output image file format comprises a bitmap image format, and wherein the processor is arranged to reduce the quality of the input image by determining a number of bits used to encode each pixel value of the compressed output image.

27. The apparatus according to claim 18, wherein the desired output image file format comprises a paletted image file format, and wherein the processor is arranged to reduce the resolution of the input image by converting the input image to a raw true-color image, reducing the resolution of the raw true-color image to produce a resized image, and encoding the resized image in accordance with the desired output image file format to produce the compressed output image.

28. The method according to claim 15, wherein the processor is arranged to reduce the resolution of the input image by iteratively searching over a range of allowed resolution values for a highest resolution value meeting the target size requirement.

29. A communication system, comprising:

one or more communication terminals, which are arranged to accept and display digitally-represented images; and a media adaptation server, which is arranged to accept a digitally-represented input image addressed to a destination terminal selected from the one or more communication terminals, to accept a target size requirement, to modify the input image by reducing at least one of a resolution of the input image and a quality of the input image, the quality defining an amount of information allocated to represent each pixel value of the input image, so as to produce a compressed output image meeting the target size requirement, and to send the compressed output image to the destination terminal, wherein the media adaptation server is arranged to accept a minimum tolerable quality requirement, to reduce the quality of the input image while meeting the minimum tolerable quality requirement, and to reduce the resolution of the input image only when reducing the quality of the input image while meeting the minimum tolerable quality requirement does not meet the target size requirement.

30. The system according to claim 29, wherein the media adaptation server comprises a terminal profile database holding image-handling capability profiles of respective terminal types, and wherein the media adaptation server is arranged to retrieve at least one of the target size requirement and a maximum resolution requirement from a capability profile of a terminal type to which the destination terminal belongs.

31. A computer software product for image adaptation, the product comprising a non-transitory computer-readable medium, in which program instructions are stored, which instructions, when read by a computer, cause the computer to accept a digitally-represented input image and a target size requirement, and to modify the input image by reducing at least one of a resolution of the input image and a quality of the input image, the quality defining an amount of information allocated to represent each pixel value of the image, so as to produce a compressed output image meeting the target size requirement, wherein the instructions cause the computer to accept a minimum tolerable quality requirement, to reduce the quality of the input image while meeting the minimum tolerable quality requirement, and to reduce the resolution of the input image only when reducing the quality of the input image while meeting the minimum tolerable quality requirement does not meet the target size requirement.

* * * * *